(12) United States Patent
Miyake

(10) Patent No.: US 11,209,700 B2
(45) Date of Patent: Dec. 28, 2021

(54) METHOD FOR MANUFACTURING LIQUID CRYSTAL PANEL, METHOD FOR MANUFACTURING RETARDATION PLATE, AND WIRE GRID POLARIZING PLATE

(71) Applicant: SHARP KABUSHIKI KAISHA, Sakai (JP)

(72) Inventor: Isamu Miyake, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 751 days.

(21) Appl. No.: 16/071,213

(22) PCT Filed: Jan. 16, 2017

(86) PCT No.: PCT/JP2017/001176
§ 371 (c)(1),
(2) Date: Jul. 19, 2018

(87) PCT Pub. No.: WO2017/126459
PCT Pub. Date: Jul. 27, 2017

(65) Prior Publication Data
US 2021/0200039 A1 Jul. 1, 2021

(30) Foreign Application Priority Data
Jan. 21, 2016 (JP) .............................. JP2016-009925

(51) Int. Cl.
*G02F 1/1337* (2006.01)
*G02F 1/13363* (2006.01)

(52) U.S. Cl.
CPC .... *G02F 1/133788* (2013.01); *G02F 1/13363* (2013.01); *G02F 1/133738* (2021.01); *G02F 2203/09* (2013.01)

(58) Field of Classification Search
CPC .......... G02F 1/133788; G02F 1/13363; G02F 1/133738; G02F 2203/09
See application file for complete search history.

(56) References Cited

U.S. PATENT DOCUMENTS 5,838,407 A 11/1998 Chigrinov et al.
6,215,539 B1 4/2001 Schadt et al.
(Continued)

FOREIGN PATENT DOCUMENTS

CN 103443668 A 12/2013
JP 2980558 B2 11/1999
(Continued)

OTHER PUBLICATIONS

T. Hashimoto et al., TN-LCD with Quartered Subpixels Using Polarized UV-Light-Irradiated Polymer Orientation Films, SID 95 Digest, p. 877-880.
(Continued)

*Primary Examiner* — Donald L Raleigh
(74) *Attorney, Agent, or Firm* — ScienBiziP, P.C.

(57) ABSTRACT

A method for manufacturing a liquid crystal panel includes irradiating a film of a photo-alignment film material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction,
(Continued)

wherein the X direction and the Y direction are perpendicular to each other in a plane parallel to the main surfaces of the polarizers, and the Y direction is a moving direction of the substrate relative to the light source.

21 Claims, 15 Drawing Sheets

(56) References Cited

U.S. PATENT DOCUMENTS

| | | | |
|---|---|---|---|
| 6,300,991 B1 | 10/2001 | Schadt et al. | |
| 6,608,661 B1 | 8/2003 | Schadt et al. | |
| 2006/0280880 A1* | 12/2006 | Park | G02F 1/133788 428/1.1 |
| 2009/0207359 A1* | 8/2009 | Shin | G02F 1/133707 349/129 |
| 2014/0227929 A1* | 8/2014 | Miyachi | G02F 1/133788 445/24 |
| 2015/0268516 A1 | 9/2015 | Miyachi et al. | |
| 2017/0285413 A1 | 10/2017 | Miyachi et al. | |

FOREIGN PATENT DOCUMENTS

| | | | | |
|---|---|---|---|---|
| JP | 2008-083215 A | | 4/2008 | |
| JP | 2008083215 A | * | 4/2008 | ........... G02F 1/1337 |
| JP | 2012-145938 A | | 8/2012 | |
| JP | 2012145938 A | * | 8/2012 | ........ G02F 1/133711 |
| JP | 2013-228533 A | | 11/2013 | |
| JP | 2013228533 A | * | 11/2013 | ............... G02B 5/30 |
| WO | 2013/031461 A | | 3/2013 | |
| WO | WO-2013031461 A1 | * | 3/2013 | ........ G02F 1/133711 |

OTHER PUBLICATIONS

Masayuki Kimura et al., A General Method to Induce Durable Liquid-Crystal Pretilt Angle on Photo-Alignment Films, JSR Technical Review No. 111/2004.

* cited by examiner

METHOD FOR MANUFACTURING LIQUID CRYSTAL PANEL, METHOD FOR MANUFACTURING RETARDATION PLATE, AND WIRE GRID POLARIZING PLATE

TECHNICAL FIELD

The present invention relates to methods for manufacturing a liquid crystal panel, methods for manufacturing a retarder, and wire grid polarizers. More specifically, the present invention relates to a method for manufacturing a liquid crystal panel and a method for manufacturing a retarder which include alignment treatment of a polymer by the photo-alignment method; and a wire grid polarizer usable in these manufacturing methods.

BACKGROUND ART

Liquid crystal panels include a liquid crystal panel element sandwiched between components such as paired glass substrates. Having features such as a thin profile, a light weight, and low power consumption, liquid crystal panels are now indispensable in components in daily life and business, such as mobile devices, various monitors, and televisions. Liquid crystal panels have been widely used for electronic book readers, digital photo frames, industrial appliances (IAs), personal computers (PCs), tablet PCs, and smartphones. As well as to display elements, liquid crystal panels are applicable to optical elements such as antennas, retarders, holograms, and optical waveguides which employ liquid crystal or a photo-alignment film. Liquid crystal panels are required to have various properties in these applications, and thus various liquid crystal alignment modes have been developed.

Liquid crystal alignment modes that have been used often are, for example, the in-plane switching (IPS) mode, the fringe field switching (FFS) mode, the twisted nematic (TN) mode, and the electrically controlled birefringence (ECB) mode, in each of which liquid crystal molecules having positive or negative anisotropy of dielectric constant are aligned in the direction parallel to the main surfaces of the substrates.

Examples of the alignment treatment for alignment films to align liquid crystal molecules include the rubbing method and the photo-alignment method. In particular, the photo-alignment method has been studied as it is a technique producing a liquid crystal panel excellent in viewing angle characteristics. The photo-alignment method irradiates an alignment film made of a photo-alignment film material with light such as ultraviolet light so as to impart alignment-controlling force to the alignment film. The photo-alignment method can achieve excellent viewing angle characteristics because it can align liquid crystal molecules in multiple directions with voltage applied. Unlike the rubbing method, the photo-alignment method can perform the alignment treatment without any contact with the surface of an alignment film, so that generation of dirt, dust, or other undesired substances can be reduced or eliminated during the alignment treatment.

The photo-alignment method is effective not only as a liquid crystal alignment treatment technique but also as a technique to produce a retarder. For example, the photo-alignment method is effective as a means for aligning reactive mesogens (RMs). Also in a photo-alignment film, the polymer constituting the film can function as a retardation layer. A photo-alignment film, already having retardation, can be formed as a retardation layer inside the liquid crystal panel by controlling the photo-alignment film to have an appropriate thickness and controlling the irradiation dose.

A photo-alignment method disclosed in Patent Literature 1, for example, is a method for producing a photo-oriented polymer network (PPN) having a tilt angle on its surface, which comprises exposing a PPN material oriented parallel to the polarization direction of light to which it is exposed, such that the direction of incidence of the light is not parallel to the normal to the surface of the photo-orientable material. There are also various other processes of the photo-alignment method studied, as disclosed in Non-Patent Literatures 1 and 2, for example.

In such a photo-alignment method, a mask for manufacturing an alignment film is utilized. Patent Literature 2, for example, discloses a mask for manufacturing an alignment film used in the irradiation of an alignment film material with linearly polarized light. The mask comprises: a transmissive substrate that transmits the light; a polarization layer that is arranged on the transmissive substrate and includes thin metal wires arranged alternately in stripes in a cycle shorter than the wavelength of the light; and an alignment mark that is formed on the transmissive substrate and formed from the same metallic material as the polarization layer.

CITATION LIST

Patent Literature

Patent Literature 1: JP 2980558 B
Patent Literature 2: JP 2008-83215 A

Non-Patent Literature

Non-Patent Literature 1: Hashimoto et al., SID95 DIGEST, p. 877 to p. 880
Non-Patent Literature 2: JSR TECHNICAL REVIEW, No. 111/2004, p. 12 to p. 20

SUMMARY OF INVENTION

Technical Problem

Yet, a method has been desired which performs alignment treatment with a high throughput especially on an alignment film or a retardation layer formed on a large-area glass substrate.

For example, in order to divide the alignment of an alignment film on a large-area glass substrate such as a first generation substrate (320 mm×400 mm) with a high throughput, a photo-alignment polarizer of the same size as the glass substrate may be produced. Production of such a large-area polarizer, however, is difficult from both the technical and cost aspects. The alignment can of course be divided by performing typical mask exposure while rotating the glass substrate, without production of such a large-area polarizer. Yet, such a mask exposure process may produce unexposed portions or double-exposed portions due to misalignment. Unexposed portions may cause light leakage, while double-exposed portions may cause alternating current (AC) image sticking. Also, such alignment division can still be improved in terms of the efficiency.

Meanwhile, a commonly used method of alignment treatment for production of a twist-alignment liquid crystal panel having a low pixel density (for example, a pixel density of 100 ppi (pixel density per inch) or lower) is the rubbing method. The rubbing method, however, is difficult to utilize as an alignment treatment method for production of a twist-alignment liquid crystal panel having a high pixel density (for example, a pixel density of 200 ppi (pixel density per inch) or higher). For this reason, the photo-alignment method has been tested as the alignment treatment method for such a purpose.

In the alignment treatment to achieve a twist alignment, typically, liquid crystal molecules are aligned at a pre-tilt angle so that alignment defects can be prevented. The pre-tilt angle is provided using polarized light. For a photo-alignment film formed from a photo-alignment film material that aligns liquid crystal molecules in the direction parallel to the polarization direction of the polarized light in a plan view, a method that provides a pre-tilt angle in one scanning exposure process has been known (Patent Literature 1). However, for a photo-alignment film formed from a photo-alignment film material that aligns liquid crystal molecules in the direction perpendicular to the polarization direction of the applied polarized light in a plan view (hereinafter, such a material is also referred to as a perpendicular photo-alignment film material), it has been difficult to efficiently, uniformly perform the treatment to provide a pre-tilt angle on the alignment film if the film is formed on a large-area glass substrate (for example, Non-Patent Literature 1). Such a perpendicular photo-alignment film material can enhance the anti-image sticking properties and long-term reliability as compared with a horizontal one. This has created a demand for efficient, uniform treatment to provide a pre-tilt angle to a photo-alignment film that is formed from a perpendicular photo-alignment film material and formed on a large-area glass substrate.

The present invention has been made in view of the above current state of the art, and aims to provide a method for manufacturing a liquid crystal panel and a method for manufacturing a retarder which can efficiently, uniformly perform alignment treatment on an alignment film or a retardation layer formed on a large-area glass substrate by the photo-alignment method without alignment unevenness; and a wire grid polarizer.

Solution to Problem

The present inventor has made various studies on processes of the photo-alignment method that can be performed on an alignment film or a retardation layer formed on a large-area glass substrate with a high throughput. The inventor has then found use of multiple polarizers that are coupled with each other such that the polarized light transmissive region is in a specific repetitive pattern. Thereby, the inventor has arrived at a solution to the above problems, completing the present invention.

In other words, one aspect of the present invention may be a method for manufacturing a liquid crystal panel, the liquid crystal panel including paired substrates facing each other; a liquid crystal layer disposed between the substrates; and a photo-alignment film disposed on a surface of at least one of the substrates adjacent to the liquid crystal layer, the method including: irradiating a film of a photo-alignment film material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

The photo-alignment film as used herein means a film that has been subjected to photo-alignment treatment by polarized light application and is thereby made capable of controlling the alignment of liquid crystal. The "polarizers" generally mean those coupled with each other by, for example, connecting them in a plane parallel to the main surfaces of the polarizers, without the polarized light transmissive regions of the polarizers superimposed on each other as viewed in the direction perpendicular to the main surfaces of the polarizers. The method for manufacturing a liquid crystal panel according to the present invention can be performed utilizing commonly used methods, except that a photo-alignment film is formed by the polarized light irradiation described above.

Another aspect of the present invention may be a method for manufacturing a retarder, including irradiating a film of a retarder material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

The retarder obtained by the method for manufacturing a retarder according to the present invention has been subjected to photo-alignment treatment by the polarized light irradiation.

Yet another aspect of the present invention may be a method for manufacturing a liquid crystal panel, the liquid crystal panel including paired substrates facing each other; a liquid crystal layer disposed between the substrates; and a retarder, the method including: irradiating a film of a retarder material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

The retarder formed by the method for manufacturing a liquid crystal panel according to the present invention has been subjected to photo-alignment treatment by the polarized light irradiation. The method for manufacturing a liquid crystal panel according to the present invention can be performed utilizing commonly used methods, except that a photo-alignment film is formed by the polarized light irradiation described above.

Yet another aspect of the present invention may be a wire grid polarizer, including polarizers each including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the wire grid polarizer.

The patent literatures and the non-patent literatures are silent as to use of polarizers coupled with each other.

Advantageous Effects of Invention

The method for manufacturing a liquid crystal panel, the method for manufacturing a retarder, and the wire grid polarizer according to the present invention enable uniform alignment treatment on an alignment film or a retardation layer formed on a large-area glass substrate with a high throughput without alignment unevenness.

DESCRIPTION OF EMBODIMENTS

Figure 1:
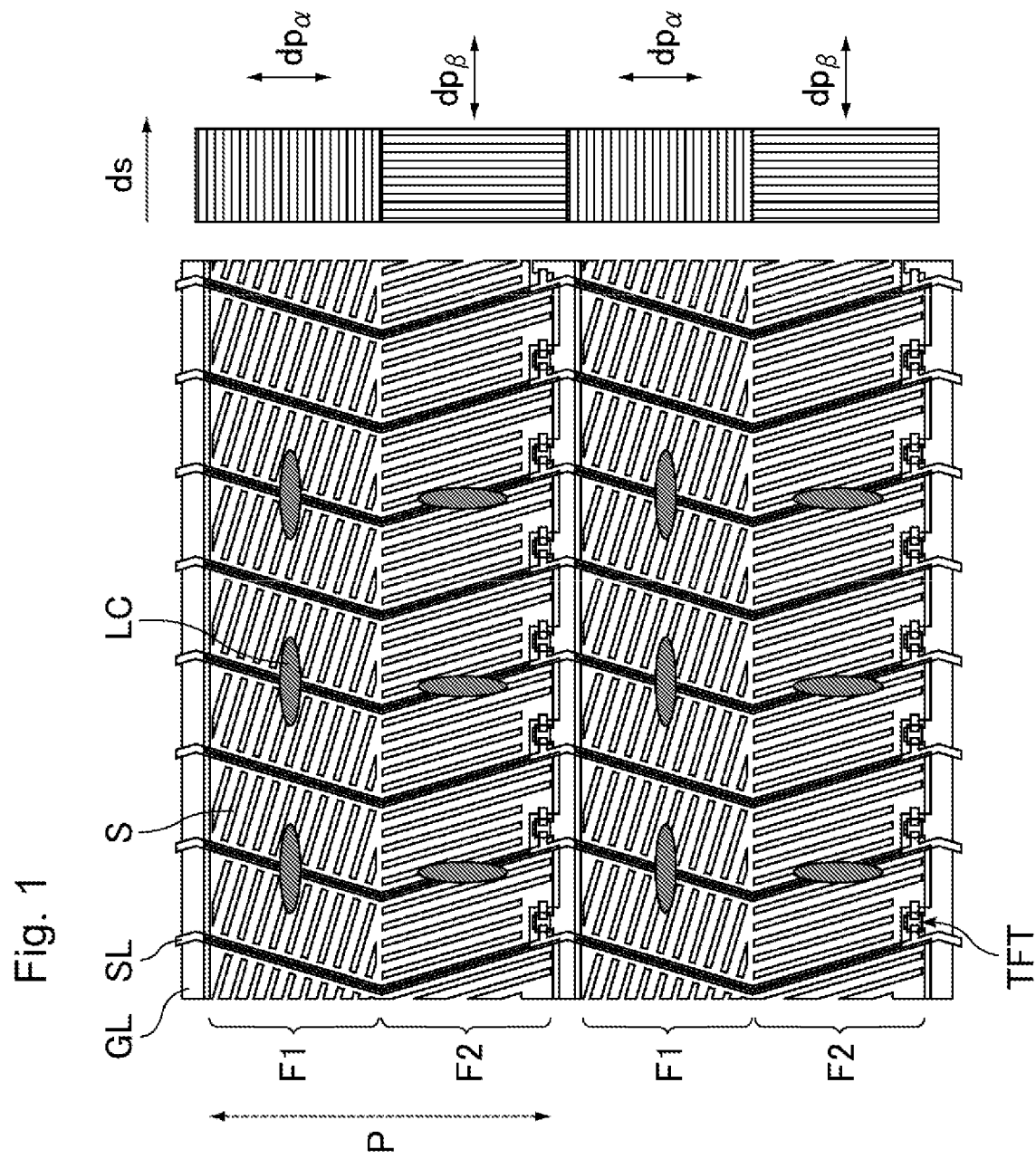
FIG. 1 is a schematic plan view showing the polarization directions of light beams applied in Example 1 and pixels in a liquid crystal panel.

Hereinafter, the present invention is described in more detail based on examples. The examples, however, are not intended to limit the scope of the present invention.

A circuit substrate of a liquid crystal panel as used herein is referred to as a thin-film transistor substrate (TFT substrate) while a substrate facing the circuit substrate, which includes color filters, is referred to as a color filter substrate (CF substrate). Yet, the counter substrate may include no color filter and the circuit substrate may include color filters.

The X direction and the Y direction mean two directions that are perpendicular to each other in a horizontal plane including substrates and polarizers. The Y direction as used herein means the direction in which a substrate is moved relative to a light source.

Scanning exposure generally means exposing a film formed from a photo-alignment film material on a surface of a substrate while moving the substrate. The exposure may be performed by moving the light source instead of moving the substrate. Also, not one of the substrate and the light source but both of the substrate and the light source may be moved. In other words, at least one of the substrate and the light source is moved so that the position of the light source relative to the surface of the substrate is moved.

Scanning exposure with the wire grid polarizer of the present invention enables uniform alignment treatment, without alignment unevenness, on an alignment film formed on a first generation (320 mm×400 mm) glass substrate as well as on an alignment film formed on a large-sized substrate such as an eighth generation (2160 mm×2460 mm) glass substrate.

Visual observation as used herein means direct visual observation through no neutral density (ND) filter, as long as there is no statement about any ND filter. The transmittance of an ND filter described below means a transmittance at wavelengths of 400 to 700 nm.

A liquid crystal panel manufactured by the manufacturing method of the present invention typically includes a liquid crystal driver. The liquid crystal driver means a circuit that has a function of driving liquid crystal molecules in the liquid crystal layer.

Each polarizer used in any of the present examples is a wire grid (hereinafter, also referred to as WG) polarizer whose polarized light transmissive region is a WG region. The WG region includes diffraction grating structures (wire grids) formed by arranging thin metal wires next to each other at a pitch shorter than the wavelength of light. In a plan view of the WG polarizer, the WG polarizer usually transmits polarized light vibrating in the direction perpendicular to the extension direction of the thin metal wires. The diameter, length, and number of the thin metal wires can be the same as those of a common one. The thin metal wires can be formed from, for example, a material such as a material containing aluminum, titanium, or molybdenum, more preferably a material containing molybdenum, particularly preferably a molybdenum silicide-based material, because such a material achieves a high degree of polarization and has heat resistance, light resistance, and ozone resistance. The WG polarizers used in any of the present examples each include a WG region and a light-shielding region that surrounds the WG region. The WG region typically has a substantially quadrangular shape in its central portion other than its end portions. The WG region decreases in width in its end portions toward the ends, and the outline shape of each end portion may be a curved or straight line. The WG polarizers are coupled with each other such that their end portions (coupling portions) where the widths of their WG regions decrease face each other. The WG polarizers may be replaced by one WG polarizing member that includes WG regions and light-shielding regions arranged in a similar pattern. The width of each WG region as used herein means the width in the Y direction. In order to make display unevenness due to coupling portions less visible, the outline shape is preferably a curved line, more preferably a curved line with a continuously varying differential coefficient, still more preferably a curved line with a differential coefficient continuously decreasing toward the end of the WG region, particularly preferably a sine curve.

Examples of polarizers usable in the present invention include polarizing beamsplitters (PBSs) as well as WG polarizers. In the case of using a polarizer including polarized light transmissive regions that transmit light beams with different polarization directions, a WG polarizer is preferred in terms of simplicity of manufacture.

The polarizers are arranged such that at least one end portion of each polarized light transmissive region is superimposed on an end portion of an adjacent polarized light transmissive region as viewed in the Y direction. There may be end portions of adjacent polarized light transmissive regions not superimposed on each other due to causes such as misalignment. Even in such a case, as described below, a liquid crystal panel obtainable by the manufacturing method of the present invention is excellent in properties such as anti-image sticking properties.

The polarizers may each further include an opening region. The polarizers may also each include polarized light transmissive regions that transmit light beams with different polarization directions, in order to apply polarized light beams with different polarization directions to different regions in the film formed on the surface of the substrate. The polarizers may each include a patterned polarized light transmissive region and a patterned light-shielding region, in order to apply polarized light beams with different irradiation doses to different regions in the film formed on the surface of the substrate.

The size of each polarizer can be, for example, 50 to 150 mm×50 to 150 mm.

In the following examples, the pre-tilt angle was measured with an OPTIPRO device from Shintech, Inc. The beam divergence angle was calculated from the following formula using an illuminance distribution of an ultraviolet beam passed through a 1-mm-diameter pinhole with the accumulated UV meter UIT-250 S365 from Ushio Inc.

[Math 1]

$$\text{Beam divergence angle} = \frac{180}{\pi} \times \arctan\left(\frac{Z}{L}\right)$$

In the formula, Z represents the distance between the position where the illuminance measured by the accumulated UV meter is the maximum and a position where the illuminance is about 10% of the maximum illuminance; and L represents the distance between the surface provided with the pinhole and the surface of the accumulated UV meter receiving the light. L was set to 300 mm.

The method for manufacturing a liquid crystal panel according to any of the present examples can reduce or eliminate unexposed regions or double-exposed regions due to misalignment by performing mask exposure and polarized light exposure using one WG polarizer basically without any additional photomask. Thereby, the method can eliminate light leakage between adjacent WG regions and thus achieve excellent display uniformity.

The following examples employ WG polarizers coupled with each other via coupling portions, and thus enable collective exposure of an alignment film formed on a large-area glass substrate. The alignment film is preferably formed from a perpendicular photo-alignment film material. Also, the WG polarizers, each appropriately including various WG regions transmitting polarized light beams with different polarization directions, opening regions, and light-shielding regions, for example, are also functionable as photomasks. Such WG polarizers can reduce the influence of misalignment, perform multi-stage exposure in one scanning process, and achieve, for example, alignment division.

In the manufacturing method of the present invention, the photo-alignment film material can be any of various materials such as a perpendicular photo-alignment film material containing a perpendicular photo-alignment group (e.g., cinnamate, azobenzene, cyclobutane, or stilbene group) or a parallel photo-alignment film material containing a parallel photo-alignment group (e.g., coumarin group). In particular, a perpendicular photo-alignment film material is preferred. A perpendicular photo-alignment film material means a polymer that aligns liquid crystal molecules in a direction that forms an angle of 87° to 93° with the polarization direction of polarized light applied to the photo-alignment film, in a plan view of the photo-alignment film. A parallel photo-alignment film material means a polymer that aligns liquid crystal molecules in the direction parallel to the polarization direction of polarized light applied to the photo-alignment film. The term "parallel" as used herein means the state where the alignment direction of liquid crystal molecules and the polarization direction of polarized light applied to the photo-alignment film form an angle of 3° or smaller.

Also in the manufacturing method of the present invention, the retarder material may be any material such as a reactive mesogen (RM), a polymer containing a RM, a material similar to the photo-alignment film material described above, or a known polymer for retarders. The retardation layer preferably has a retardation of 50 to 300 nm, more preferably 100 to 150 nm.

Example 1

Figure 2:
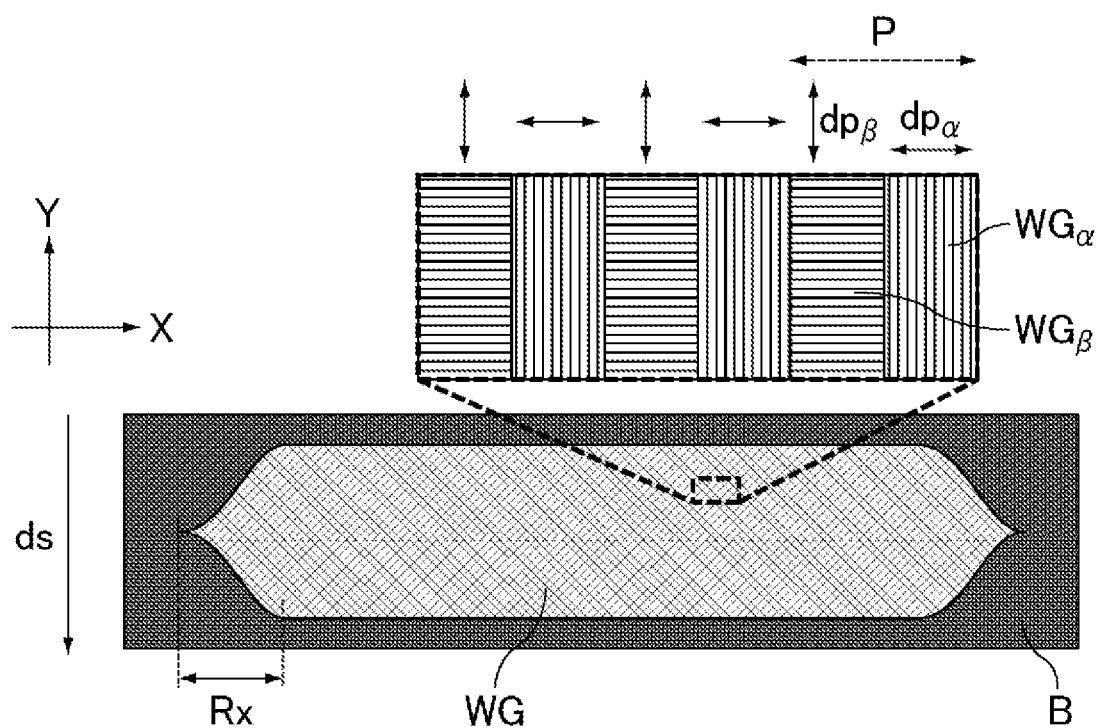
FIG. 2 is a schematic plan view of a wire grid polarizer used in Example 1.

FIG. 1 is a schematic plan view showing the polarization directions of light beams applied in Example 1 and pixels in a liquid crystal panel. The liquid crystal panel of Example 1 is a two-domain FFS-mode liquid crystal panel. FIG. 2 is a schematic plan view of a wire grid polarizer used in Example 1.

A polyamic acid solution was applied to a TFT substrate and a CF substrate (pixel pitch P: 96 μm) each having a size of 320 mm×400 mm (the polyamic acid solution used was a solution of 5% by mass polyamic acid in a solvent containing N-methyl-2-pyrrolidone (NMP) and butyl cellosolve (BC) at a ratio of 7:3. The polyamic acid had a cinnamate group in its diamine side chain). Each substrate was pre-baked at 90° C. for one minute. The pre-baked substrate had a thickness of 100 nm. The substrate was then post-baked at 200° C. for 40 minutes. Thereafter, exposure was performed while the substrate (TFT substrate or CF substrate) was moved in the substrate-moving direction ds.

Each of the WG polarizers used in the exposure was one shown in FIG. 2. The WG polarizer shown in FIG. 2 includes regions with wire grids (WG regions $WG_\alpha$ and $WG_\beta$) and a light-shielding region B, in a plan view of the polarizer. The WG regions $WG_\alpha$ and the WG regions $WG_\beta$ are arranged such that their polarized light transmissive directions ($dp_\alpha$, $dp_\beta$) are perpendicular to each other, so that a liquid crystal panel can be obtained in which the alignment in each pixel provided by the alignment film is divided. From the viewpoints of light leakage prevention and pre-tilt angle uniformity, the region of the WG polarizer other than the WG regions is shielded from light. The shape (outline shape) of a coupling portion Rx of each WG region was a sine curve. The WG polarizer had a wire grid (WG) pattern pitch of 96 μm, which was the same as the pixel pitch P. The WG pattern pitch has the same meaning as a repeating pattern pitch in a WG region. The pixel pitch P has the same meaning as the pitch between gate bus lines GL. In the case where there are two different pitches S and T between gate bus lines, the pixel pitch P is the sum of S and T.

The irradiation doses of polarized light beams applied to the film through the WG regions $WG_\alpha$ and $WG_\beta$ of the WG polarizer shown in FIG. 2 were each 20 mJ/cm² at a wavelength of 313 nm. The average gap (proximity gap) between the WG polarizer and the exposure surface of the substrate was 200 μm. The scanning rate for the substrate was 70 mm/sec. The beam divergence angle of light used in exposure was 1°. The exposure directions for the TFT substrate and the CF substrate were set to achieve a two-domain alignment FFS mode, and the TFT substrate and the CF substrate were bonded to each other.

Between the bonded TFT substrate and CF substrate was sealed liquid crystal. The liquid crystal used was a MLC3019 (Merck Ltd.) material.

To the outer surfaces of the TFT substrate and the CF substrate were bonded polarizers such that their transmission axes were perpendicular to each other. Thereby, a two-domain FFS-mode liquid crystal panel was produced.

As shown in FIG. 1, in the liquid crystal panel of Example 1, source bus lines SL extend in a zigzag manner in the column direction while gate bus lines GL extend straight in the row direction. The source bus lines SL intersect the gate bus lines GL.

The TFT substrate includes the source bus lines SL, the gate bus lines GL, thin-film transistor elements (TFTs) each connected to the corresponding source bus line SL and gate bus line GL, and transparent pixel electrodes each connected to the corresponding TFT. The TFTs and the pixel electrodes are formed in the respective pixel regions. Each pixel electrode is provided with parallel slits S in each FFS-mode region (FFS-mode region F1 or FFS-mode region F2) of the corresponding pixel region. The polarized light beams with the polarization directions $dp_\alpha$ and $dp_\beta$ passed through the WG polarizer are applied to a film formed from a perpendicular photo-alignment film material, thereby forming photo-alignment films each aligning liquid crystal molecules LC in the directions perpendicular to the respective polarization directions $dp_\alpha$ and $dp_\beta$ with no voltage applied.

Figure 3:
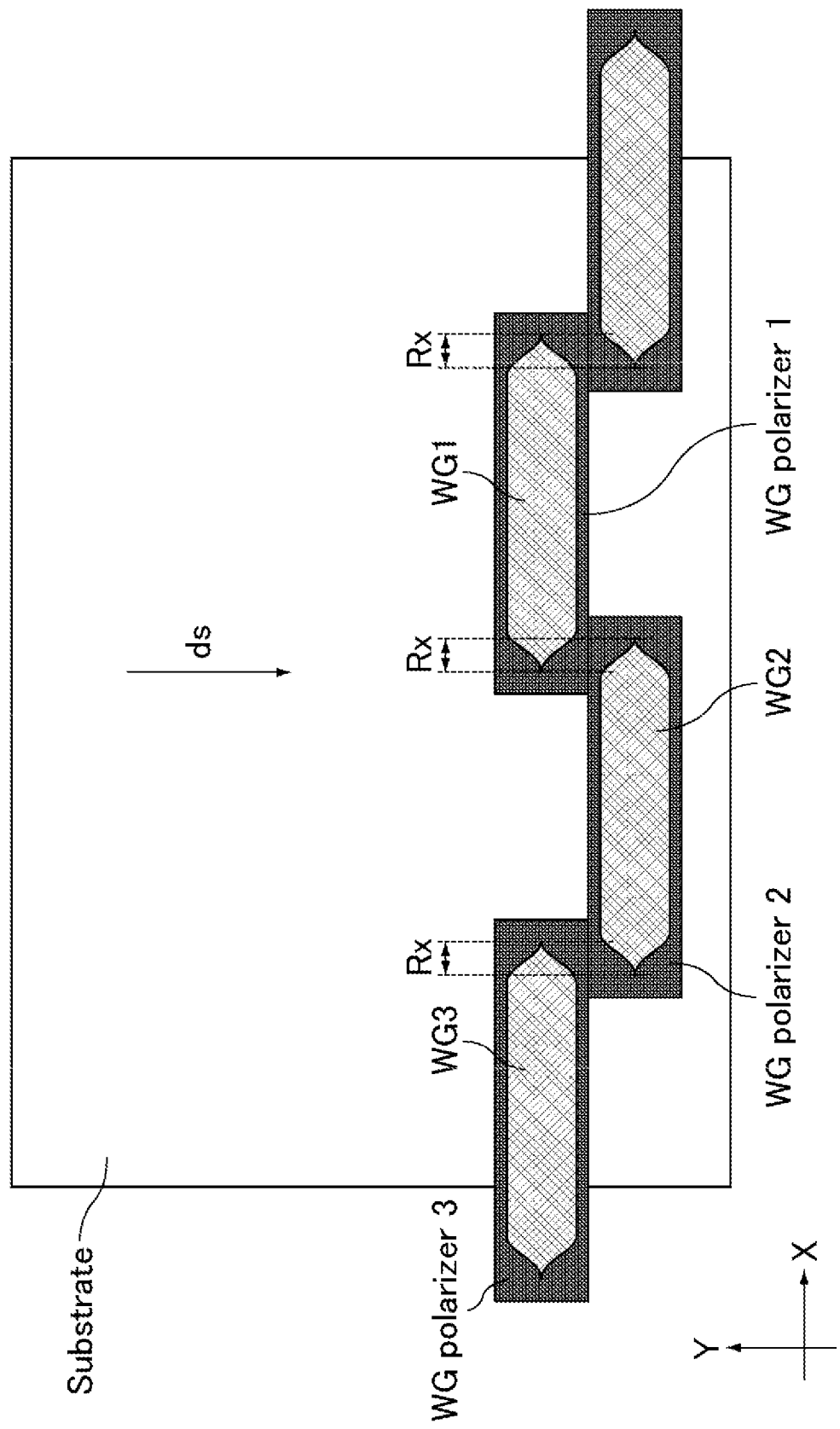
FIG. 3 is a schematic plan view showing arrangement of wire grid polarizers and a substrate during exposure.
Figure 4:
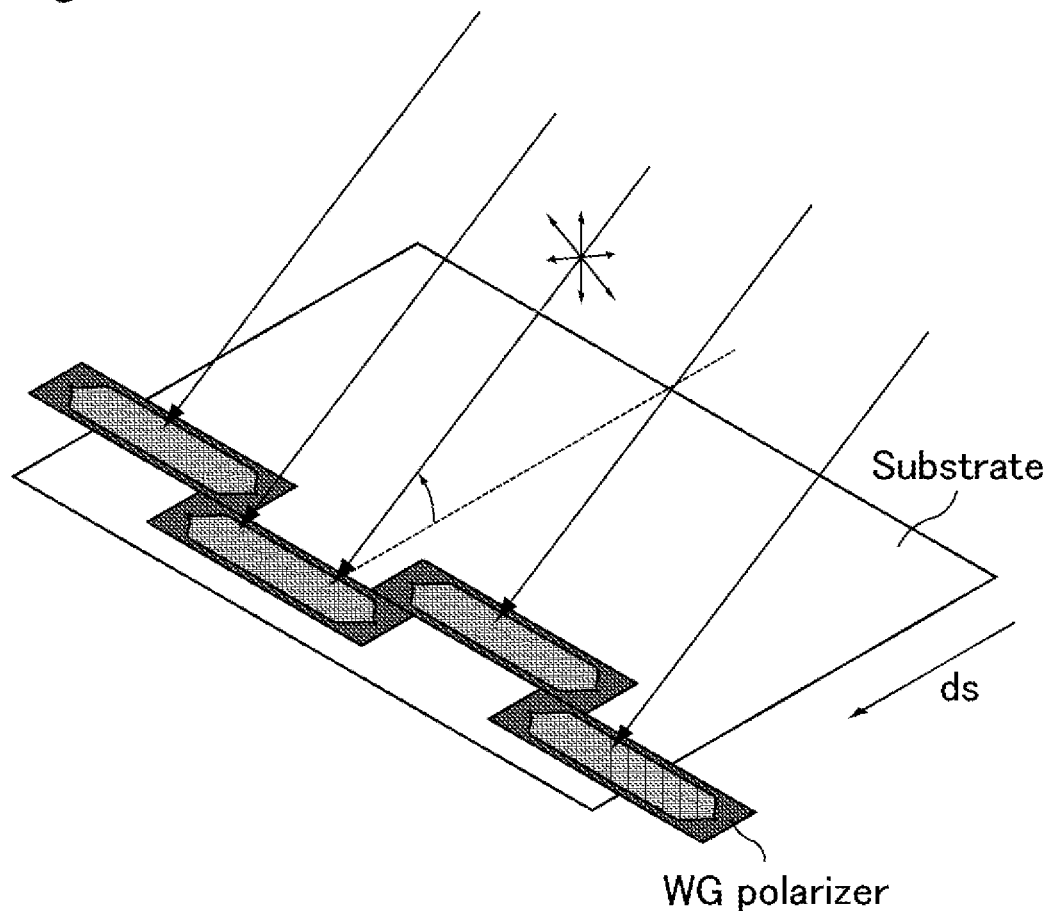
FIG. 4 is a perspective view showing the relationship between the exposure direction during exposure and the arrangement of the wire grid polarizers and the substrate.

FIG. 3 is a schematic plan view showing arrangement of wire grid polarizers and a substrate during exposure. FIG. 4 is a perspective view showing the relationship between the exposure direction during exposure and the arrangement of the wire grid polarizers and the substrate.

Scanning exposure was performed while the substrate (TFT substrate or CF substrate) was moved in the substrate-moving direction ds with the geometry (arrangement of the WG polarizers and the substrate, and the relationship between the arrangement and the exposure direction) shown in FIG. 3 and FIG. 4. Here, for collective exposure of such an alignment film formed on a large-area glass substrate, it is difficult to produce a large-area WG polarizer with uniform degrees of polarization, transmittance, and polarization axis. Instead of a large-area WG polarizer, polarizers were used which were coupled with each other such that the area of the polarization region of the WG polarizers was 150 cm² or smaller and the coupling portions Rx of adjacent polarizers faced each other. In other words, polarizers were used which were coupled with each other such that the coupling portions Rx of adjacent polarizers were superimposed on each other as viewed in the Y direction.

The incident direction of the polarized light on the substrate may be the normal direction of the substrate surface or an oblique direction relative to the normal direction of the substrate surface as shown in FIG. 4. Still, the incident direction is preferably an oblique direction relative to the normal direction of the substrate surface because there are more selectable alignment treatments and materials and thus various alignment modes can be achieved. In the case where the incident direction of the polarized light is an oblique direction relative to the normal direction of the substrate surface, the incident direction and the moving direction of the substrate or light source are preferably parallel to each other in a plan view of the substrate. Typically, the light from the light source which is incident on the WG polarizers is non-polarized light.

The obtained FFS-mode liquid crystal panel was evaluated. The evaluation results are as follows.
(Display Uniformity in Example 1)

In order to determine whether the substrate was more evenly exposed to light through the coupling portions Rx of the WG polarizers, a gray screen at a grayscale value of 32 was visually evaluated in a dark room using a backlight set at a luminance of 5000 cd/m². No display unevenness was visually observed.
(Image Sticking in Example 1)

A checkered pattern image was displayed at grayscale values of 255 and 0 for one hour, followed by visual observation of a gray screen at a grayscale value of 32 in a dark room using a backlight set at a luminance of 5000 cd/m². No image sticking was visually observed.

A two-domain FFS-mode liquid crystal panel having good anti-image sticking properties and no display unevenness was obtained by dividing the alignment of the large-area substrate in one scanning exposure process using the WG polarizers coupled with each other via the coupling portions Rx.

Modified Example of Example 1

Figure 5:
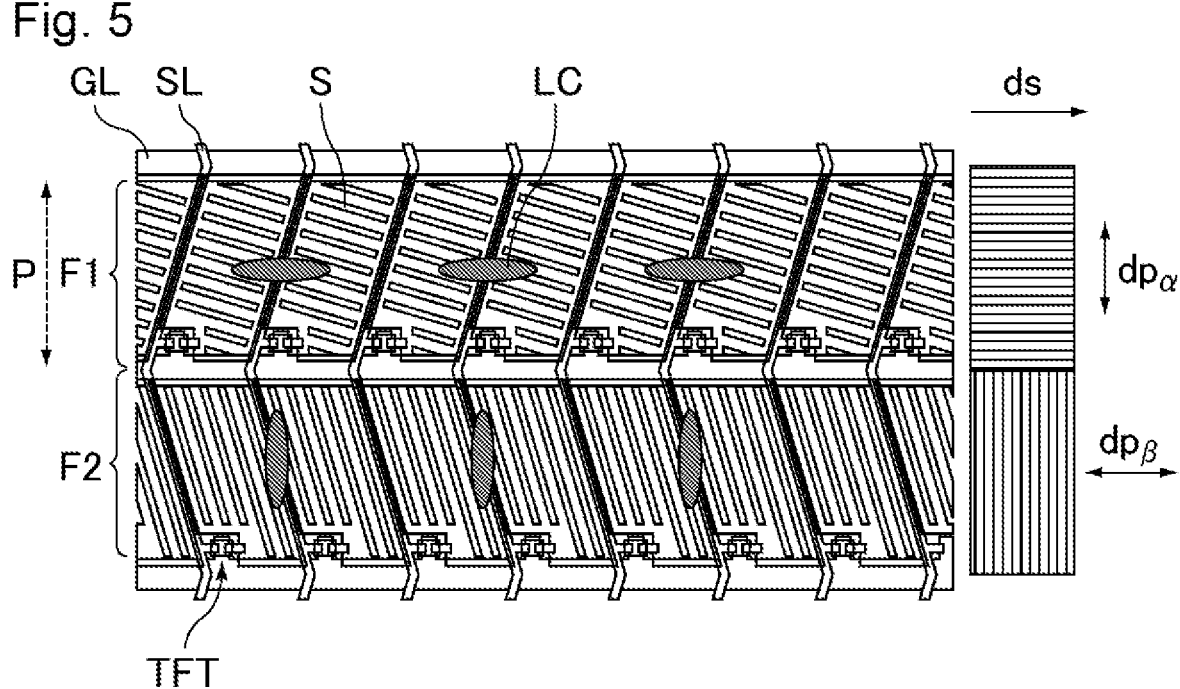
FIG. 5 is a schematic plan view showing the polarization directions of light beams applied in a modified example of Example 1 and pixels in a liquid crystal panel.

FIG. 5 is a schematic plan view showing the polarization directions of light beams applied in a modified example of Example 1 and pixels in a liquid crystal panel.

In the modified example of Example 1, the pixel pitch P shown in FIG. 5 was 96 µm. The WG pattern pitch was 192 µm, which was twice the pixel pitch P.

In the modified example of Example 1, the TFT substrate includes the source bus lines SL, the gate bus lines GL, the thin-film transistor elements (TFTs) each connected to the corresponding source bus line SL and gate bus line GL, and transparent pixel electrodes each connected to the corresponding TFT. The TFTs and the pixel electrodes are formed in the respective pixel regions. Each pixel electrode is provided with parallel slits S in each pixel region (the pixel region in each FFS-mode region F1 or the pixel region in each FFS-mode region F2). The polarized light beams with the polarization directions $dp_\alpha$ and $dp_\beta$ passed through the WG polarizer are applied to a film formed from a perpendicular photo-alignment film material, thereby forming photo-alignment films each aligning liquid crystal molecules LC in the directions perpendicular to the respective polarization directions $dp_\alpha$ and $dp_\beta$ with no voltage applied. The manufacturing method of the modified example of Example 1 is the same as the manufacturing method of Example 1 except for the conditions described above.

The obtained FFS-mode liquid crystal panel was evaluated. The evaluation results are as follows.
(Display Uniformity in Modified Example of Example 1)

The evaluation was performed as in Example 1. No display unevenness was visually observed.
(Image Sticking in Modified Example of Example 1)

The evaluation was performed as in Example 1. No image sticking was visually observed.

The WG pattern pitch as used herein may be any pitch and may be higher than the pixel pitch P as in the modified example of Example 1. For better viewing angle characteristics, the relation "2×(pixel pitch P)≥(WG pattern pitch)" preferably holds.

In Example 1 and the modified example thereof, the alignment division can be achieved in one scanning exposure process using the WG polarizers each including the various WG regions transmitting light beams with different polarization directions.

Example 2

Figure 6:
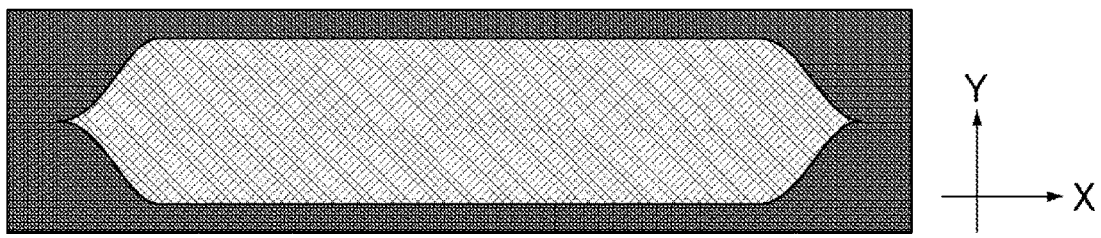
FIG. 6 is a schematic plan view of a wire grid polarizer used in Example 2.
Figure 7:
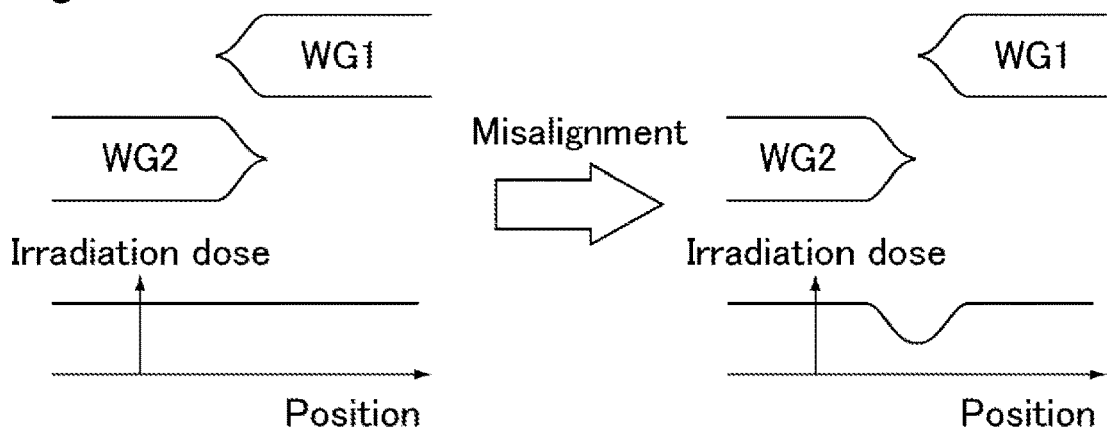
FIG. 7 is a schematic view showing a change in irradiation dose due to misalignment in Example 2.

FIG. 6 is a schematic plan view of a wire grid polarizer used in Example 2. FIG. 7 is a schematic view showing a change in irradiation dose due to misalignment in Example 2. In FIG. 7, the light-shielding regions of the WG polarizers are not illustrated and only WG regions WG1 and WG2 of the WG polarizers are illustrated.

One of two adjacent WG polarizers was placed away from the normal position (as shown in the graph of position versus irradiation dose to the left in FIG. 7, the position where the end portion of the WG region WG1 with a decreasing width is superimposed on the end portion of the WG region WG2 with a decreasing width as viewed in the Y direction and where the irradiation dose is constant regardless of the position on the film surface) by 960 µm in the X direction (Example 2 shown in the graph to the right in FIG. 7). The other conditions were the same as those in Example 1.

The obtained FFS-mode liquid crystal panel was evaluated. The evaluation results are as follows.
(Display Uniformity in Example 2)

The evaluation was performed as in Example 1. No display unevenness due to the coupling portions was visually observed through an ND filter (50% transmittance) (with no ND filter, light leakage was visually observed). The light leakage visually observed through no ND filter was due to the misalignment at the coupling portions.
(Image Sticking in Example 2)

The evaluation was performed as in Example 1. No image sticking was visually observed.

Modified Example of Example 2

Figure 8:
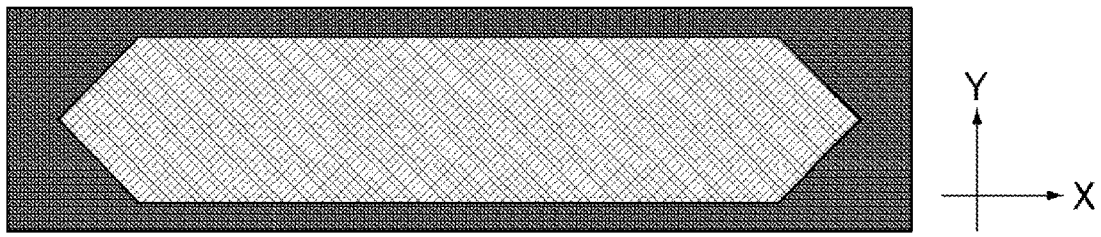
FIG. 8 is a schematic plan view of a wire grid polarizer used in a modified example of Example 2.
Figure 9:
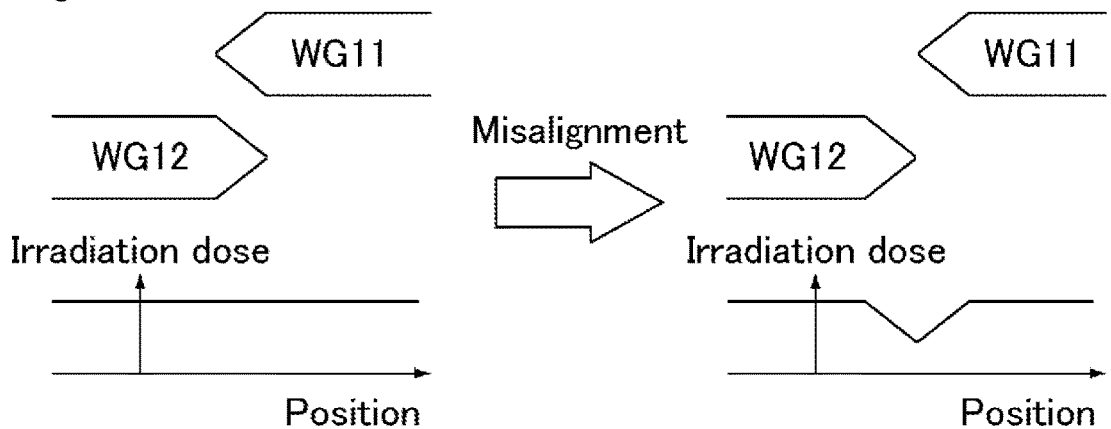
FIG. 9 is a schematic view showing a change in irradiation dose due to misalignment in the modified example of Example 2.

FIG. 8 is a schematic plan view of a wire grid polarizer used in a modified example of Example 2. FIG. 9 is a schematic view showing a change in irradiation dose due to misalignment in the modified example of Example 2.

One of two adjacent WG polarizers was placed away from the normal position (as shown in the graph of position versus irradiation dose to the left in FIG. 9, the position where the end portion of a wire grid region WG11 with a decreasing width is superimposed on the end portion of a wire grid region WG12 with a decreasing width as viewed in the Y direction and where the irradiation dose is constant regardless of the position on the film surface) by 960 µm in the X direction (modified example of Example 2 shown in the graph to the right in FIG. 9). The WG pattern shape at the coupling portions in each WG polarizer was changed from a curved line to a linear line. The other conditions were the same as those in Example 2.
(Display Uniformity in Modified Example of Example 2)

The evaluation was performed as in Example 1. Display unevenness due to the coupling portions was not visually observed through an ND filter (20% transmittance) but was visually observed through another ND filter (50% transmittance), more clearly than in Example 2. Display unevenness due to the coupling portions were more noticeable in the modified example of Example 2 than in Example 2 presumably because the differential coefficient of the luminance change changes as the differential coefficient of the irradiation dose changes continuously as shown in the graph to the right in FIG. 7 in Example 2 whereas the differential coefficient of the luminance change changes discontinuously as the differential coefficient of the irradiation dose changes discontinuously as shown in the graph to the right in FIG. 9 in the modified example of Example 2.
(Image Sticking in Modified Example of Example 2)

The evaluation was performed as in Example 1. No image sticking was visually observed.

The results in Example 2 and the modified example thereof show that the shape of each coupling portion of each WG region is preferably a curved line with which the differential coefficient continuously decreases toward the end of the WG region in the X direction. In particular, the shape is more preferably a sine curve. This shape leads to a continuous decrease in the differential coefficient of the irradiation dose even when misalignment occurs, enabling the panel to keep its sufficient display uniformity.

Comparative Example 1

Figure 10:
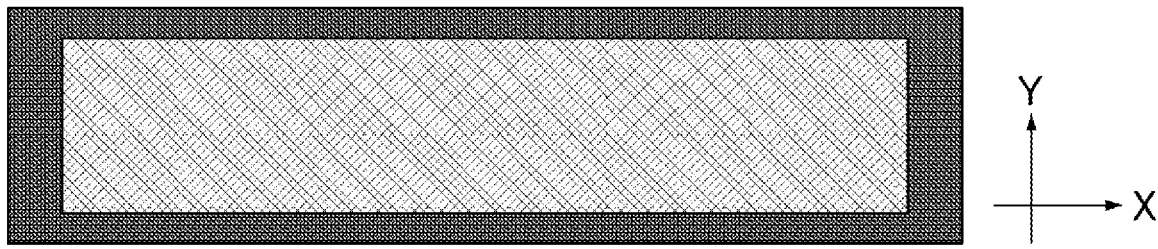
FIG. 10 is a schematic plan view of a wire grid polarizer used in Comparative Example 1.
Figure 11:
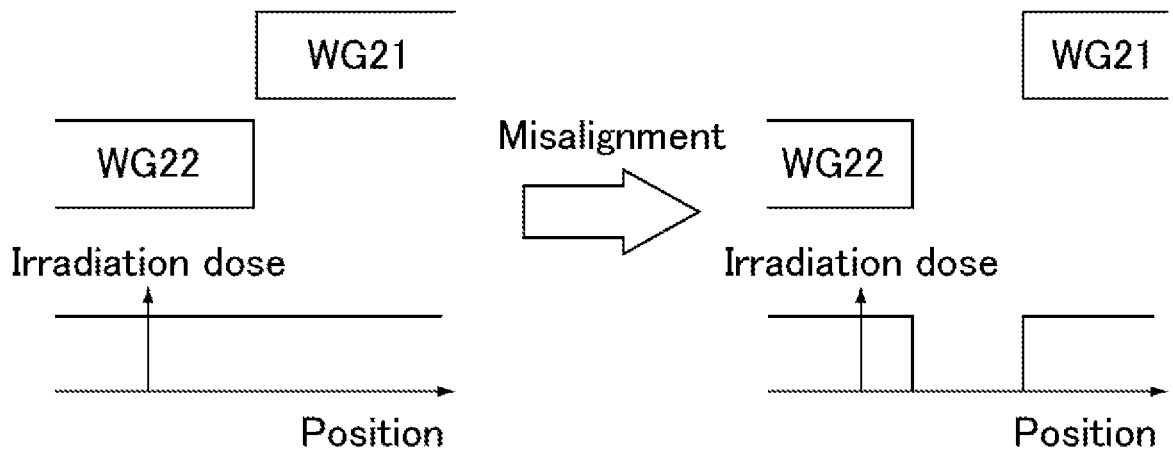
FIG. 11 is a schematic view showing a change in irradiation dose due to misalignment in Comparative Example 1.

FIG. 10 is a schematic plan view of a wire grid polarizer used in Comparative Example 1. FIG. 11 is a schematic view showing a change in irradiation dose due to misalignment in Comparative Example 1.

One of two adjacent WG polarizers was placed away from the normal position (as shown in the graph of position (position of the alignment film) versus irradiation dose to the left in FIG. 11, the position where a wire grid region WG21 and a wire grid region WG22 are arranged and where the irradiation dose is constant regardless of the position on the film surface) by 960 µm in the X direction (the graph to the right in FIG. 11). The WG polarizers used in Comparative Example 1 include no coupling portion where the WG region decreases in width as shown in Examples 1 and 2. The other conditions were the same as those in Example 2.

The obtained FFS-mode liquid crystal panel was evaluated. The evaluation results are as follows.
(Display Uniformity in Comparative Example 1)

The evaluation was performed as in Example 1. Display unevenness due to the coupling portions of the WG polarizers was visually observed through an ND filter (1% transmittance). This is because non-alignment regions were produced as a result of the discontinuous change in irradiation dose due to misalignment at the coupling portions.
(Image Sticking in Comparative Example 1)

The evaluation was performed as in Example 1. Image sticking due to the coupling portions of the WG polarizers was visually observed through an ND filter (1% transmittance). Non-alignment regions cause AC image sticking as well as display unevenness.

In the case where the applied light is parallel light, the light adversely influences the display uniformity and anti-image sticking properties unless the coupling portions include a polarization region such as a wire grid region. The present invention may employ any application light other than parallel light. Yet, the application light is preferably parallel light because the proximity gap described above can be increased and scratches on the substrate due to dust or any other foreign substance during scanning can be reduced. Here, if dust can be completely removed, diffused light can also be used without the problem described above.

Figure 12:
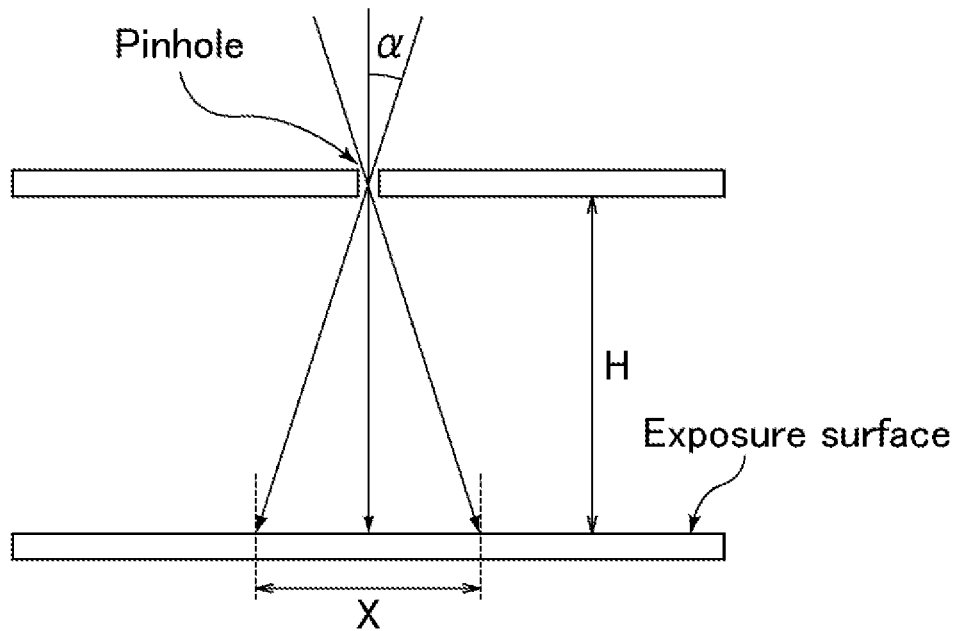
FIG. 12 is a schematic view showing the relationship among a beam diameter X, a proximity gap H, and a beam divergence angle α during exposure.

FIG. 12 is a schematic view showing the relationship among a beam diameter X, a proximity gap H, and a beam divergence angle α during exposure.

The beam diameter X in exposure can be calculated from the following formula.

$$X = 2H \times \tan(\alpha)$$

The width of the bright line at the boundary in the two-domain FFS-mode liquid crystal panel (boundary between the F1 region and the F2 region in the liquid crystal panel in the example shown in FIG. 1) measured was 15 µm. Based on this value, the allowable beam diameter X is up to 15 µm and the beam divergence angle of the parallel light is a common value of 1° or smaller. The proximity gap H is then 430 µm or greater. This gap is enough as the proximity gap for scanning exposure, and thus the substrate is prevented from damaging the WG polarizers. From these viewpoints, the application light is preferably parallel light. Meanwhile, a proximity gap considered comparatively safe in consideration of the irregularities on the TFT substrate and the CF substrate is about 5 µm. With this value, the beam divergence angle of light can be increased up to 56°. Light with such a beam divergence angle is typically called diffused light. In the case where the proximity gap is about 5 µm as described above, the substrate can be damaged by foreign substances (if present) attached to the WG polarizers.

Comparative Example 2

Figure 13:
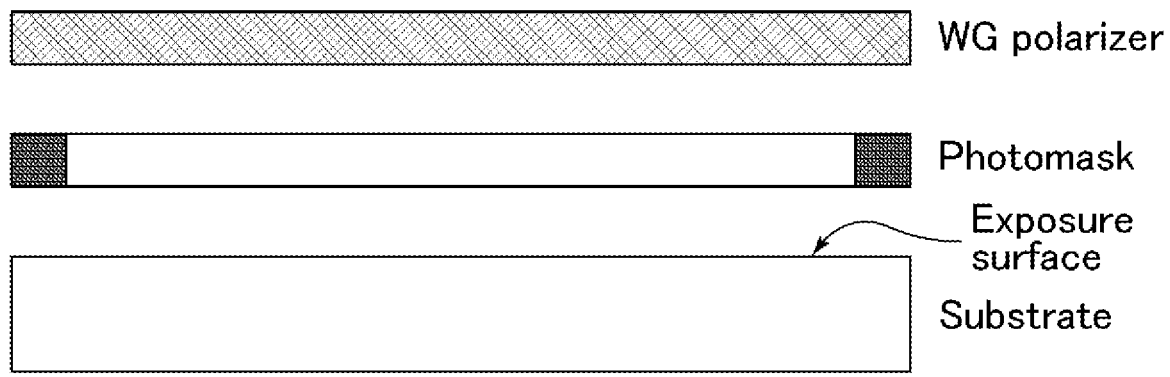
FIG. 13 is a schematic cross-sectional view of a wire grid polarizer, a photomask, and the exposure surface of a substrate in Comparative Example 2.
Figure 14:
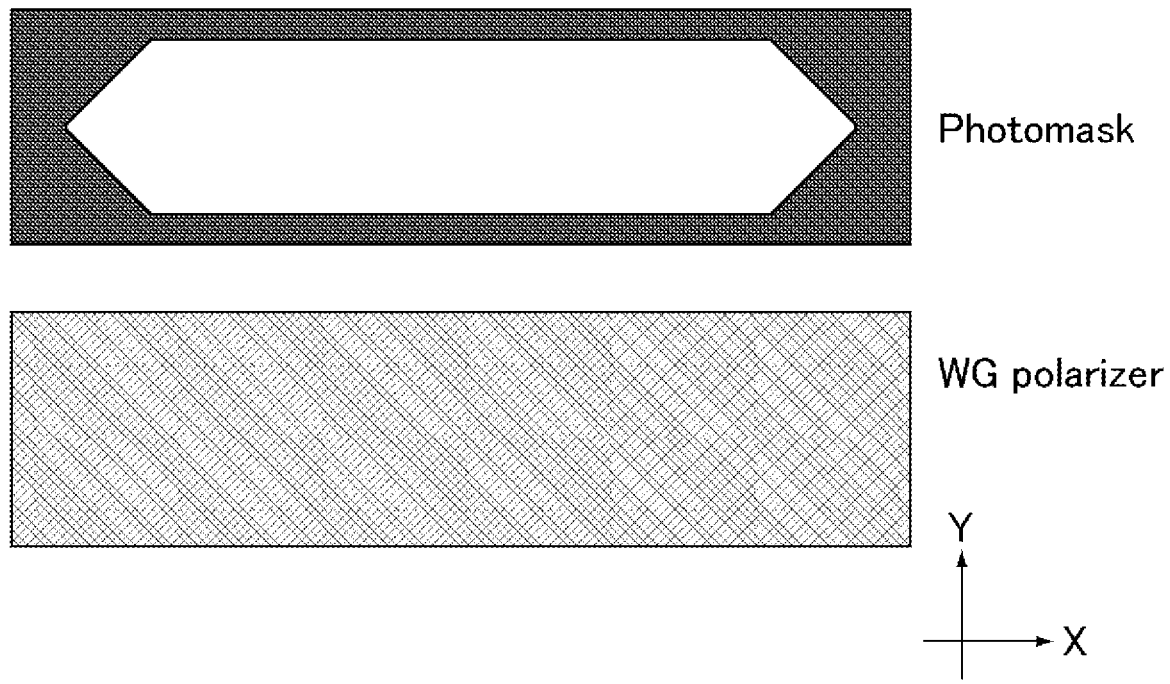
FIG. 14 is a schematic plan view of the wire grid polarizer and the photomask in Comparative Example 2.

FIG. 13 is a schematic cross-sectional view of a wire grid polarizer, a photomask, and the exposure surface of a substrate in Comparative Example 2. FIG. 14 is a schematic plan view of the wire grid polarizer and the photomask in Comparative Example 2.

WG polarizers with no light-shielding region and photomasks were used. The other conditions were the same as those in Example 1. In Comparative Example 2, photomasks are coupled with each other via their end portions where the opening decreases in width (not illustrated), as with the case of the WG polarizers in the examples described above. One of two adjacent photomasks was placed away from the normal position by 960 µm in the X direction. The misalignment between the WG polarizers and the photomasks was 50 µm in the X direction.

The obtained FFS-mode liquid crystal panel was evaluated. The evaluation results are as follows.
(Display Uniformity in Comparative Example 2)

The evaluation was performed as in Example 1. Display unevenness due to the coupling portions of the photomasks was visually observed through an ND filter (3% transmittance). This is because there was a luminance difference between the region with a first photomask and the region with a second photomask due to misalignment between the WG polarizers and the exposure surface of the substrate.
(Image Sticking in Comparative Example 2)

The evaluation was performed as in Example 1. No image sticking was visually observed.

In Example 1 and the other examples, for example, only the alignment accuracy between the WG polarizers and the substrate needed to be considered. In Comparative Example 2 further employing photomasks, however, the alignment accuracy between the photomasks and the substrate and the alignment accuracy between the photomasks and the WG polarizers need to be considered. Here, if the alignment accuracy between the photomasks and the substrate and the alignment accuracy between the WG polarizers and the substrate were the same, the alignment accuracy at least doubly decreases as compared with Example 1 and the other examples. In addition, the photomasks each preferably have a thickness of about 1 mm. With such a thickness, the distance between the WG polarizers and the substrate is several times the distance in Example 1 and the other examples, which may also be a cause of the decrease in alignment accuracy.

Example 3

Figure 15:
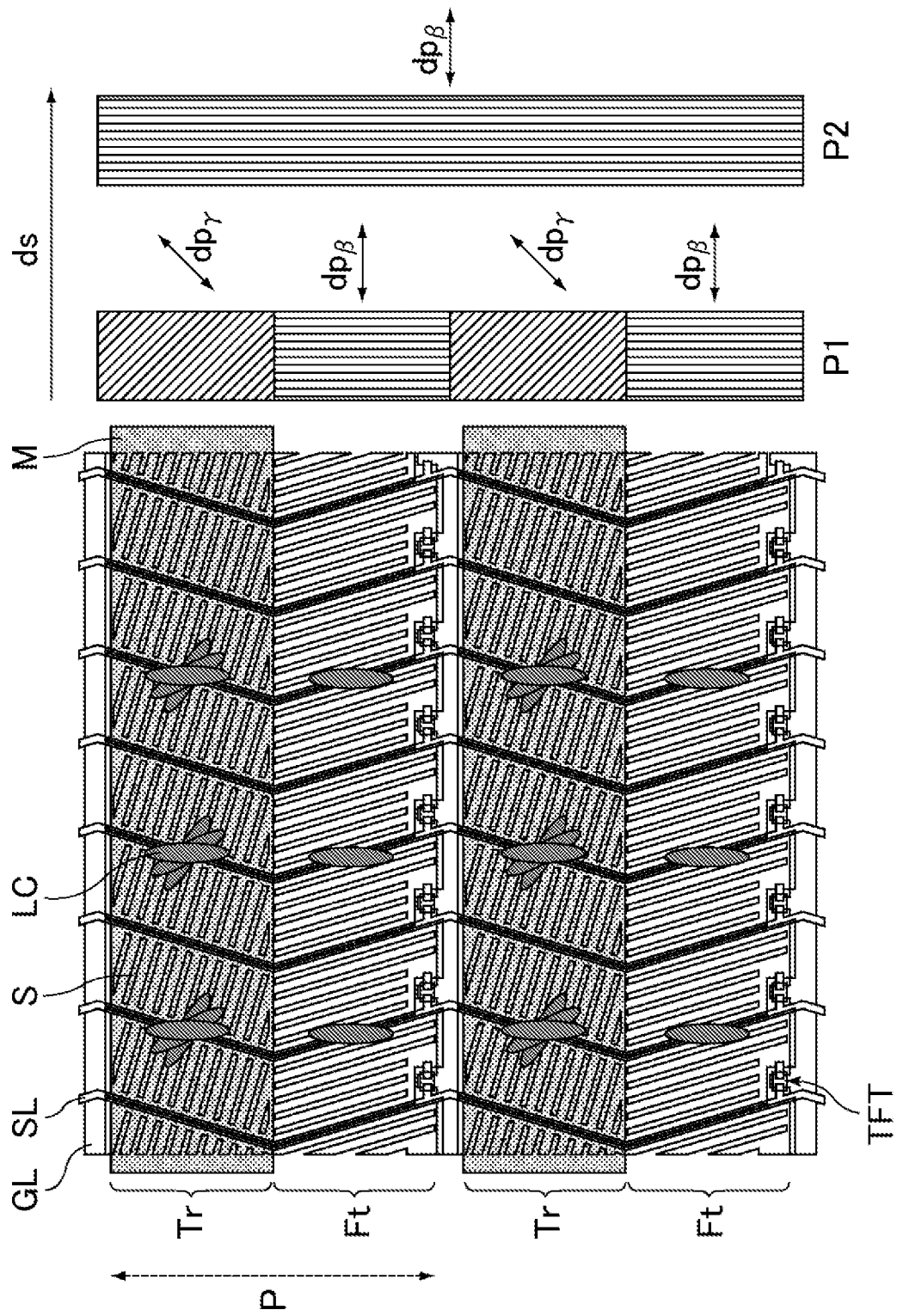
FIG. 15 is a schematic plan view showing the polarization directions of light beams applied in Example 3 and pixels in a liquid crystal panel.
Figure 16:
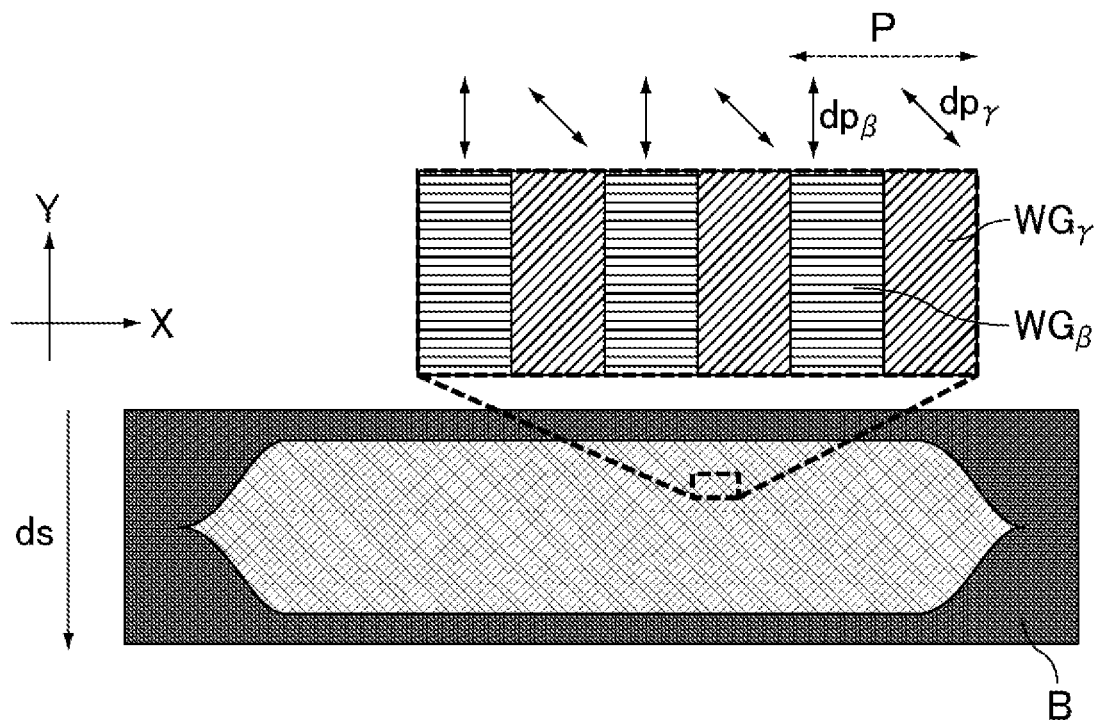
FIG. 16 is a schematic plan view of a wire grid polarizer used in exposure of a TFT substrate in Example 3.
Figure 17:
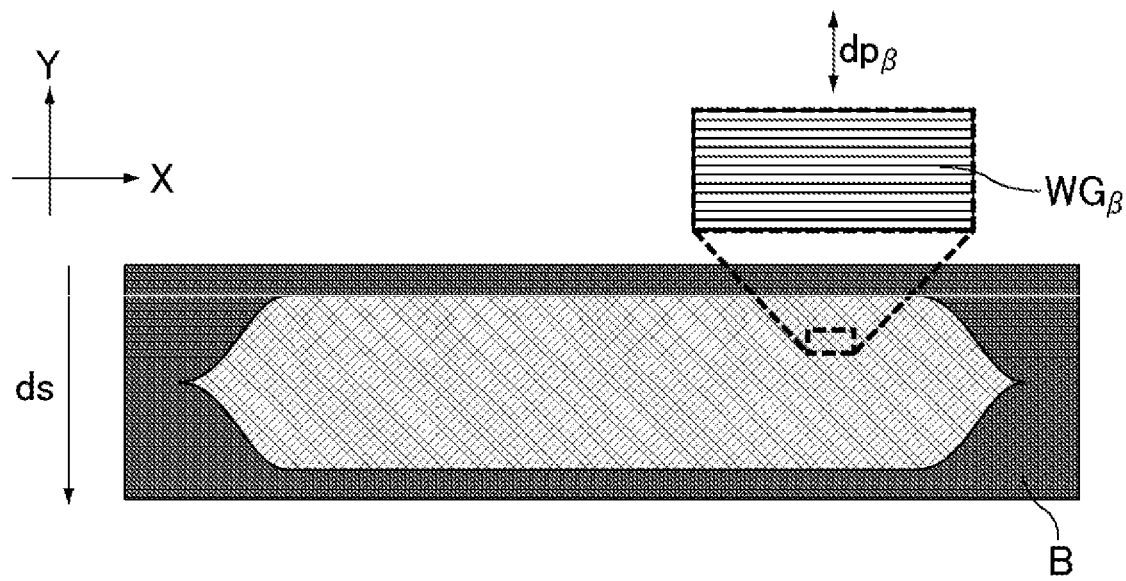
FIG. 17 is a schematic plan view of a wire grid polarizer used in exposure of a CF substrate in Example 3.

FIG. 15 is a schematic plan view showing the polarization directions of light beams applied in Example 3 and pixels in a liquid crystal panel. FIG. 16 is a schematic plan view of a wire grid polarizer used in exposure of a TFT substrate in Example 3. FIG. 17 is a schematic plan view of a wire grid polarizer used in exposure of a CF substrate in Example 3.

A polyamic acid solution was applied to a TFT substrate and a CF substrate each having a size of 320 mm×400 mm (the polyamic acid solution used was a solution of 5% by mass polyamic acid in a solvent containing N-methyl-2-pyrrolidone (NMP) and butyl cellosolve (BC) at a ratio of 7:3. The polyamic acid had a cinnamate group in its diamine side chain). Each substrate was pre-baked at 90° C. for one minute. The pre-baked substrate had a thickness of 100 nm. The substrate was then post-baked at 200° C. for 40 minutes. Thereafter, exposure was performed while the substrate (TFT substrate or CF substrate) was moved in the substrate-moving direction ds.

Each of the WG polarizers used in the exposure of the TFT substrate was one shown in FIG. 16. Each of the WG polarizers used in the exposure of the CF substrate was one shown in FIG. 17. The WG polarizer shown in FIG. 16 includes first WG regions $WG_\gamma$, second WG regions $WG_\beta$, and the light-shielding region B in a plan view of the polarizer. The first WG regions $WG_\gamma$ and the second WG regions $WG_\beta$ are arranged alternately in stripes in the direction (X direction) perpendicular to the substrate-moving direction ds and have different polarization directions for light. During exposure, the polarizer applies first polarized light beams with the polarization direction $dp_\gamma$ to the film through the first WG regions $WG_\gamma$ using the light source, and applies second polarized light beams with the polarization direction $dp_\beta$, which is different from the polarization direction $dp_\gamma$, to the film through the second WG regions $WG_\beta$ using the light source. The WG polarizer shown in FIG. 17 includes WG regions $WG_\beta$ and the light-shielding region B in a plan view of the polarizer, and applies polarized light beams with the polarization direction $dp_\beta$ to the film through the WG regions $WG_\beta$ using the light source, during exposure. The WG pattern shape at the coupling portions was a sine curve. Scanning exposure was performed with the geometry shown in FIG. 3 and FIG. 4.

The irradiation doses of light beams applied through the WG regions $WG_\beta$ and $WG_\gamma$ of the WG polarizer shown in FIG. 16 and FIG. 17 were each 20 mJ/cm$^2$ at a wavelength of 313 nm. The scanning rate for the substrate was 70 mm/sec. The beam divergence angle of light used in exposure was 1°. The exposure directions for the TFT substrate and the CF substrate were set to achieve a two-domain alignment FFS mode+twist mode. The twist angle of the alignment in each twist region was 64°. The liquid crystal layer had the same thickness in FFS-mode transmissive regions Ft and reflective twist regions Tr. The TFT substrate and the CF substrate were then bonded to each other, and liquid crystal was sealed between them. The liquid crystal used was MLC3019 (Merck Ltd.). To the outer surfaces of the TFT substrate and the CF substrate were bonded polarizers such that their transmission axes were perpendicular to each other. Thereby, a two-domain transflective liquid crystal panel was produced.

As shown in FIG. 15, in the liquid crystal panel of Example 3, the source bus lines SL extend in a zigzag manner in the column direction while the gate bus lines GL extend straight in the row direction. The source bus lines SL intersect the gate bus lines GL.

The TFT substrate includes the source bus lines SL, the gate bus lines GL, thin-film transistor elements (TFTs) each connected to the corresponding source bus line SL and gate bus line GL, and transparent pixel electrodes each connected to the corresponding TFT. The TFTs and the pixel electrodes are formed in the respective pixel regions. Each pixel electrode is provided with parallel slits S in each of the reflective twist region Tr and the FFS-mode transmissive region Ft of the corresponding pixel region. In the reflective twist regions Tr of the TFT substrate, metallic reflective films M were arranged. The polarized light beams with the polarization directions $dp_\beta$ and $dp_\gamma$ passed through the WG regions (P1 shown in FIG. 15) of the WG polarizer shown in FIG. 16 are applied to a film formed from a perpendicular photo-alignment film material, thereby forming on the TFT substrate a photo-alignment film aligning liquid crystal molecules (LC shown in FIG. 15) in the directions perpendicular to the respective polarization directions $dp_\beta$ and $dp_\gamma$ with no voltage applied. Also, the polarized light beams with the polarization direction $dp_\beta$ passed through the WG region (P2 shown in FIG. 15) of the WG polarizer shown in FIG. 17 are applied to a film formed from a perpendicular photo-alignment film material, thereby forming on the CF substrate a photo-alignment film aligning liquid crystal molecules (LC shown in FIG. 15) in the direction perpendicular to the polarization direction $dp_\beta$ with no voltage applied.

The obtained transflective liquid crystal panel was evaluated. The evaluation results are as follows.

(Display Uniformity in Example 3)

The evaluation was performed as in Example 1. No display unevenness due to the coupling portions was visually observed.

(Image Sticking in Example 3)

The evaluation was performed as in Example 1. No image sticking due to the coupling portions was visually observed.

A two-domain transflective liquid crystal panel having good anti-image sticking properties and no display unevenness was obtained by dividing the alignment of the large-area substrate in one scanning exposure process using the wire grid polarizers coupled with each other via the coupling portions.

Example 4

A polyamic acid solution was applied to a TFT substrate and a CF substrate each having a size of 320 mm×400 mm (the polyamic acid solution used was a solution of 5% by mass polyamic acid in a solvent containing N-methyl-2-pyrrolidone (NMP) and butyl cellosolve (BC) at a ratio of 7:3. The polyamic acid had an azobenzene group in its diamine main chain). Each substrate was pre-baked at 90° C. for one minute. The pre-baked substrate had a thickness of 100 nm. Thereafter, exposure was performed while the substrate (TFT substrate or CF substrate) was moved.

Each of the WG polarizers used in the exposure of the TFT substrate and the CF substrate was one shown in FIG. 2. The WG pattern shape (outline shape) at the coupling portions was a sine curve. Scanning exposure was performed with the geometry shown in FIG. 3 and FIG. 4.

The irradiation doses of light beams applied through the WG regions of the WG polarizer shown in FIG. 2 were each 1000 mJ/cm² at a wavelength of 365 nm. The scanning rate for the substrate was 2 mm/sec. The exposure directions for the TFT substrate and the CF substrate were set to achieve a two-domain alignment FFS mode. Then, the substrates were post-baked at 110° C. for 20 minutes, subsequently at 200° C. for 20 minutes. The other conditions were the same as those in Example 1.

The obtained FFS-mode liquid crystal panel was evaluated. The evaluation results are as follows.

(Display Uniformity in Example 4)

The evaluation was performed as in Example 1. No display unevenness due to the coupling portions was visually observed.

(Image Sticking in Example 4)

The evaluation was performed as in Example 1. No image sticking due to the coupling portions was visually observed.

A two-domain FFS-mode liquid crystal panel having good anti-image sticking properties and no display unevenness was obtained by dividing the alignment of the large-area substrate in one scanning exposure process using the WG polarizers coupled with each other via the coupling portions.

The results in Example 4 show that the photo-functional group can be one other than the cinnamate group. In the case of using an azobenzene group, however, an irradiation dose as large as 1000 mJ/cm² is required. Since the irradiation dose in exposure with parallel light is low, the throughput may decrease in the case of using an azobenzene group. The photo-functional group is therefore preferably a cinnamate group which is highly sensitive.

As well as an azobenzene group, the photo-functional group can also be a perpendicular photo-alignment group that aligns liquid crystal molecules in the direction perpendicular to the polarization direction of the applied polarized light in a plane parallel to the photo-alignment film surface, such as cyclobutane and stilbene groups, or a parallel photo-alignment group that aligns liquid crystal molecules in the direction parallel to the polarization direction of the applied polarized light, such as a coumarin group. Yet, these groups also typically require an irradiation dose of 300 to 1000 mJ/cm².

Example 5

Figure 18:
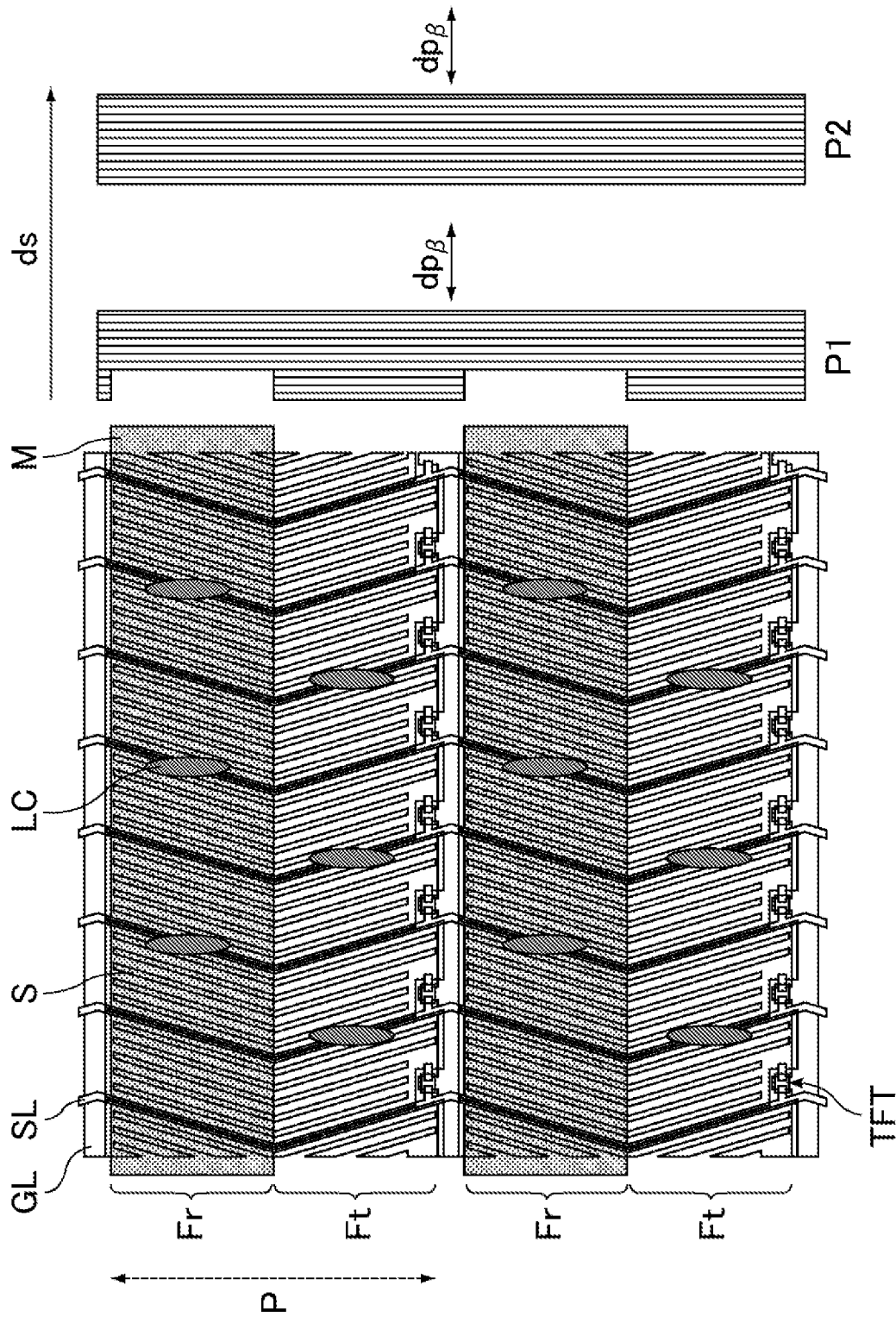
FIG. 18 is a schematic plan view showing the polarization direction of light beams applied in Example 5 and pixels in a liquid crystal panel.
Figure 19:
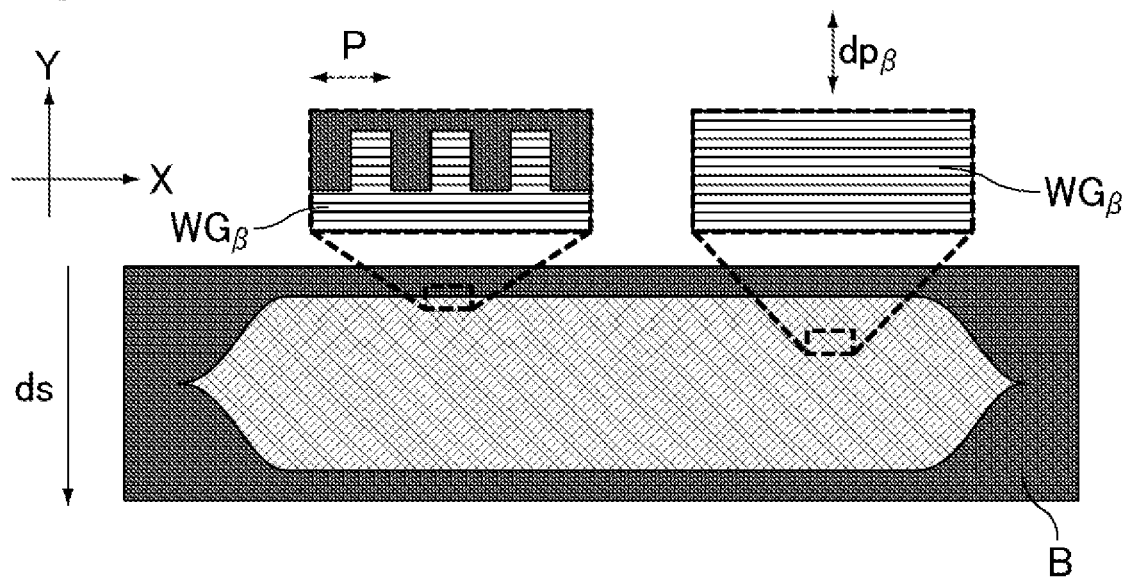
FIG. 19 is a schematic plan view of a wire grid polarizer used in exposure of a TFT substrate in Example 5.

FIG. 18 is a schematic plan view showing the polarization direction of light beams applied in Example 5 and pixels in a liquid crystal panel. FIG. 19 is a schematic plan view of a wire grid polarizer used in exposure of a TFT substrate in Example 5.

Each of the WG polarizers used in the exposure of the CF substrate was the same as that shown in FIG. 17, and each of the WG polarizers used in the exposure of the TFT substrate was the same as that shown in FIG. 19. The WG polarizer shown in FIG. 19 includes the WG region $WG_\beta$ and the light-shielding region B in a plan view of the polarizer. The outline shape of the polarizer except for the end portions was irregular. In exposure, polarized light beams with different irradiation doses are applied in stripes to the respective regions of a film through the polarized light transmissive regions of such wire grid polarizers using a light source. Specifically, the irradiation dose for the film is reduced in the reflective region of each pixel while the irradiation dose for the film is increased in the transmissive region of each pixel. The shape of the coupling portions of each WG region was a sine curve. Scanning exposure was performed with the geometry shown in FIG. 3 and FIG. 4. The irradiation dose of light beams applied through the WG region of the WG polarizer shown in FIG. 17 was 20 mJ/cm² at a wavelength of 313 nm. The outline shape of the WG region of WG polarizer shown in FIG. 19 except for the end portions was irregular as described above, and the widths are different. The irradiation dose of light beams applied through the WG region of the WG polarizer shown in FIG. 19 was 20 mJ/cm² at a wavelength of 313 nm in regions where the amount of light blocked was small, while it was 12 mJ/cm² at a wavelength of 313 nm in regions where the amount of light blocked was large. The exposure directions for the TFT substrate and the CF substrate were set to achieve a uniform FFS mode, and the TFT substrate and the CF substrate were bonded to each other. In the transmissive regions, the liquid crystal layer had a thickness that is twice the thickness in the reflective regions. The other conditions were the same as those in Example 3.

As shown in FIG. 18, in the liquid crystal panel of Example 5, the source bus lines SL extend in a zigzag manner in the column direction while the gate bus lines GL extend straight in the row direction. The source bus lines SL are perpendicular to the gate bus lines GL.

The TFT substrate includes the source bus lines SL, the gate bus lines GL, thin-film transistor elements (TFTs) each connected to the corresponding source bus line SL and gate bus line GL, and transparent pixel electrodes each connected to the corresponding TFT. The TFTs and the pixel electrodes are formed in the respective pixel regions. Each pixel electrode is provided with parallel slits S in each of the FFS-mode region Fr and the FFS-mode region Ft of the corresponding pixel region. In the FFS-mode reflective regions Fr of the TFT substrate, the metallic reflective films M were arranged. The polarized light beams with the polarization direction $dp_\beta$ passed through the WG region (P1 shown in FIG. 18) of the WG polarizer shown in FIG. 19 are applied to a film formed from a perpendicular photo-alignment film material, thereby forming on the TFT substrate a photo-alignment film aligning liquid crystal molecules (LC shown in FIG. 18) in the direction perpendicular to the polarization direction $dp_\beta$ with no voltage applied. Also, the polarized light beams with the polarization direction $dp_\beta$ passed through the WG region (P2 shown in FIG. 18) of the WG polarizer shown in FIG. 17 are applied to a film formed from a perpendicular photo-alignment film material, thereby forming on the CF substrate a photo-alignment film aligning liquid crystal molecules (LC shown in FIG. 18) in the direction perpendicular to the polarization direction $dp_\beta$ with no voltage applied.

The obtained FFS-mode liquid crystal panel was evaluated. The evaluation results are as follows.

(Display Uniformity in Example 5)

The evaluation was performed as in Example 1. No display unevenness was visually observed.

(Image Sticking in Example 5)

The evaluation was performed as in Example 1. No image sticking was visually observed.

In Example 5, an FFS-mode transflective liquid crystal panel having good anti-image sticking properties and no light leakage was obtained by dividing the alignment of the large-area substrate in one process using the WG polarizers coupled with each other via the coupling portions. Also, the irradiation dose for each region of the alignment film was controlled by providing the light-shielding region to the WG polarizer and adjusting the width of the light-shielding region.

Example 6

Figure 20:
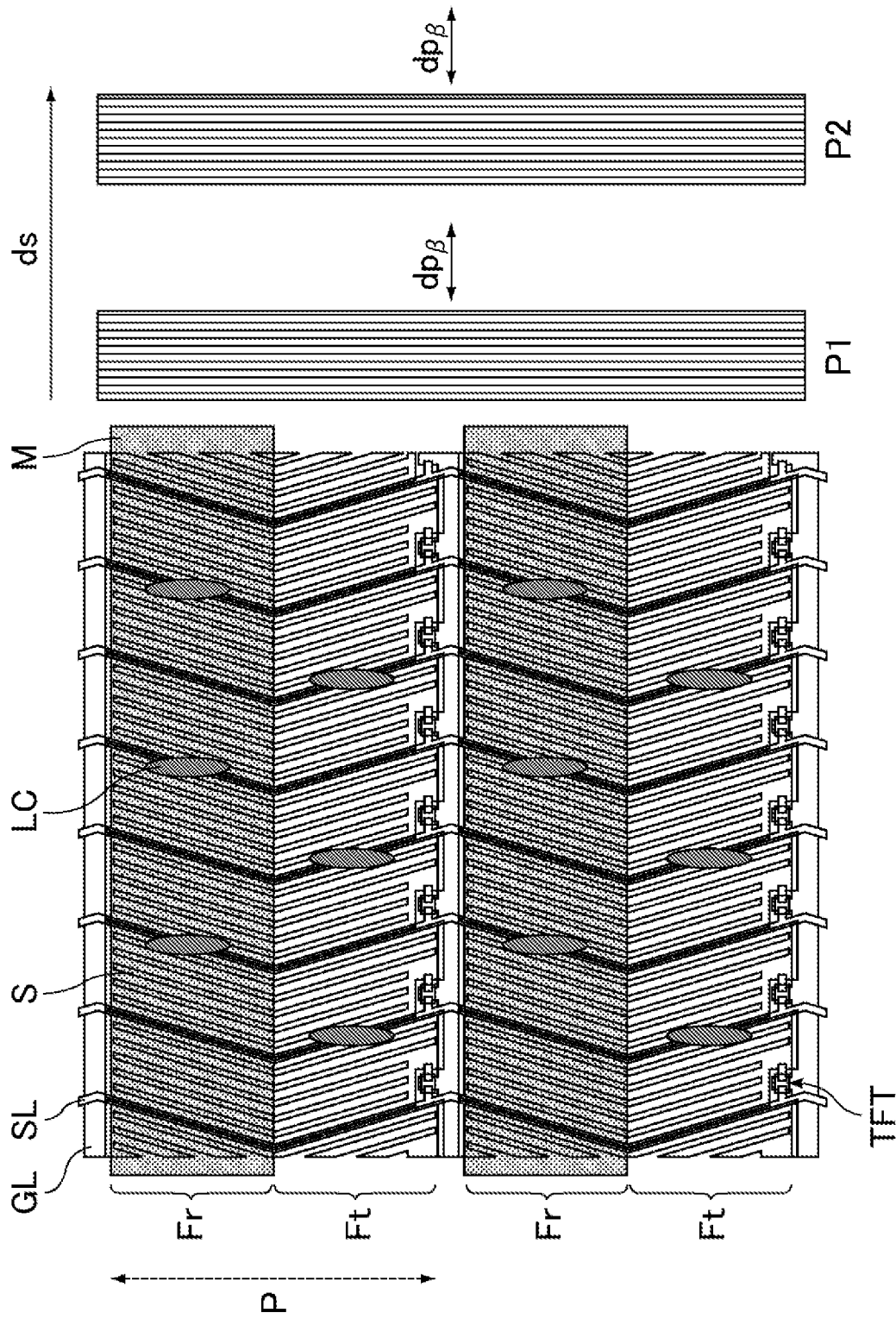
FIG. 20 is a schematic plan view of a wire grid polarizer used in Example 6.

FIG. 20 is a schematic plan view of a wire grid polarizer used in Example 6.

Each of the WG polarizers used in the exposure of the TFT substrate and the CF substrate was one shown in FIG. 17. The irradiation dose of light beams applied through the WG region of the WG polarizer shown in FIG. 17 was 20 mJ/cm$^2$ at a wavelength of 313 nm as in Example 5. The other conditions were the same as those in Example 5.

The obtained FFS-mode liquid crystal panel was evaluated. The evaluation results are as follows.
(Display Uniformity in Example 6)
The evaluation was performed as in Example 1. No display unevenness was visually observed.
(Image Sticking in Example 6)
The evaluation was performed as in Example 1. Image sticking was observed through an ND filter (50% transmittance).

The reflective regions of the TFT substrate reflect applied light as well, so that the effective irradiation dose of light applied to the photo-alignment film is greater than the designed irradiation dose. If the effective irradiation dose exceeds the optimal irradiation dose, the anti-image sticking properties may deteriorate because of photodimerization reaction of the cinnamate group in the polyamic acid. The anti-image sticking properties deteriorated in Example 5 as compared with Example 6 because the absorption of light by the photo-alignment film in the reflective regions increased.

Example 7

Figure 21:
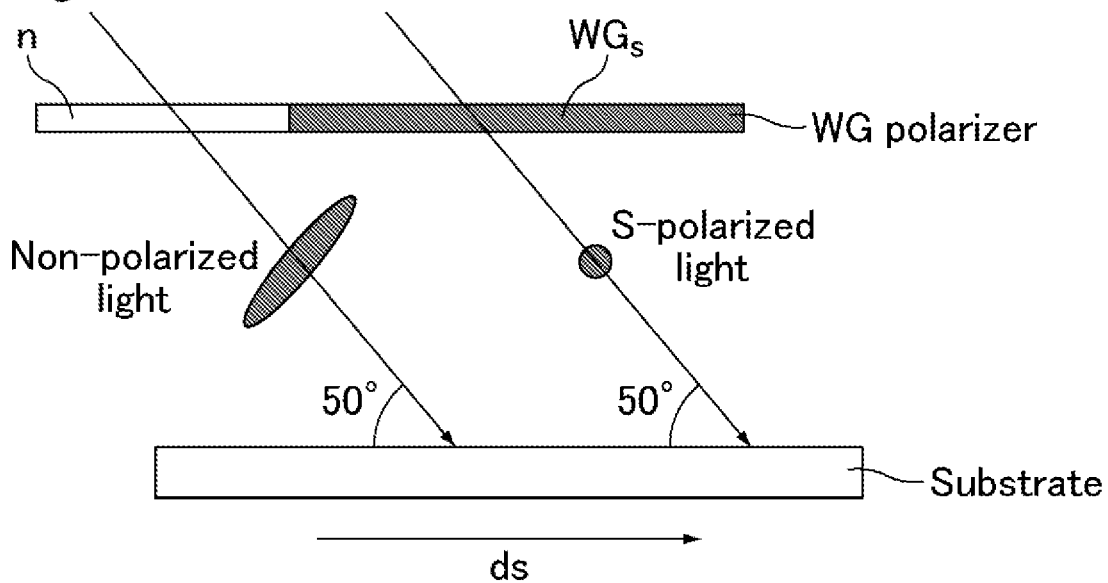
FIG. 21 is a schematic view showing how a substrate is irradiated with light beams having passed through a non-polarized light transmissive region and a wire grid region of a wire grid polarizer in Example 7.
Figure 22:
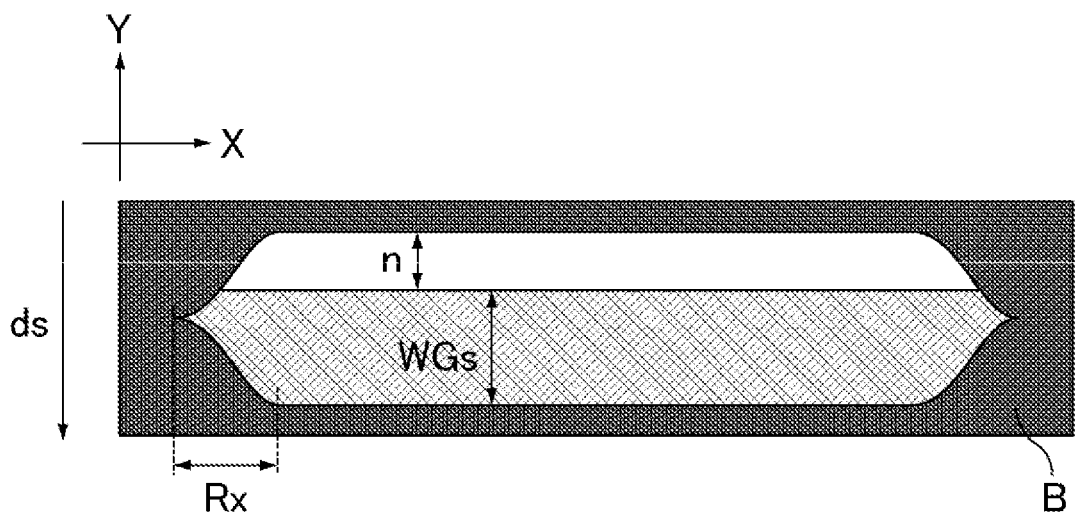
FIG. 22 is a schematic plan view of the wire grid polarizer used in Example 7.

FIG. 21 is a schematic view showing how a substrate is irradiated with light beams having passed through a non-polarized light transmissive region and a wire grid region of a wire grid polarizer in Example 7. FIG. 22 is a schematic plan view of the wire grid polarizer used in Example 7.

A polyamic acid solution was applied to a TFT substrate and a CF substrate (the polyamic acid solution used was a solution of 5% by mass polyamic acid in a solvent containing N-methyl-2-pyrrolidone (NMP) and butyl cellosolve (BC) at a ratio of 7:3. The polyamic acid had a cinnamate group in its diamine side chain). Each substrate was pre-baked at 90° C. for one minute. The pre-baked substrate had a thickness of 100 nm. Thereafter, exposure was performed while the substrate (TFT substrate or CF substrate) was moved in the substrate-moving direction ds.

Each of the WG polarizers used in the exposure of the TFT substrate and the CF substrate was one shown in FIG. 22. Scanning exposure was performed with the geometry shown in FIG. 3 and FIG. 4.

As shown in FIG. 21, in Example 7, non-polarized light is applied to a film surface through a non-polarized light transmissive region (opening region) n of the WG polarizer, while s-polarized light is applied to the film surface through a WG region WG$_s$ of the WG polarizer. The incident angle of the non-polarized light and the s-polarized light on the film surface was 50°.

The WG polarizer shown in FIG. 22 includes the WG region WG$_s$, the non-polarized light transmissive region (opening region) n with no wire grid, and the light-shielding region B, in a plan view of the polarizer.

The irradiation dose of light beams applied through the non-polarized light transmissive region n of the WG polarizer shown in FIG. 22 was 20 mJ/cm$^2$ at a wavelength of 313 nm, while the irradiation dose of light beams applied through the WG region WG$_s$ was 20 mJ/cm$^2$ at a wavelength of 313 nm. The scanning rate for the substrate was 70 mm/sec. Exposure was performed such that the pre-tilt angles provided by the TFT substrate and the CF substrate were perpendicular to each other. The TFT substrate and the CF substrate were then bonded to each other, and liquid crystal was sealed between them. The liquid crystal used was obtained by dissolving a chiral agent in MLC3019 (Merck Ltd.). To the outer surfaces of the TFT substrate and the CF substrate were bonded polarizers such that their transmission axes were parallel to each other. Thereby, a TN-mode liquid crystal panel was produced. The pre-tilt angle measured was 0.3°. A TN-mode liquid crystal panel providing uniform display without disclination or light leakage was produced.

In Example 7, two-stage exposure was performed in one scanning exposure process. With the opening regions including no WG and the WG regions in the WG polarizers as described above, the first stage exposure was performed by applying non-polarized light from an oblique direction through the opening regions, and the second stage exposure was performed by applying s-polarized light from an oblique direction through the WG regions.

Example 8

Figure 23:
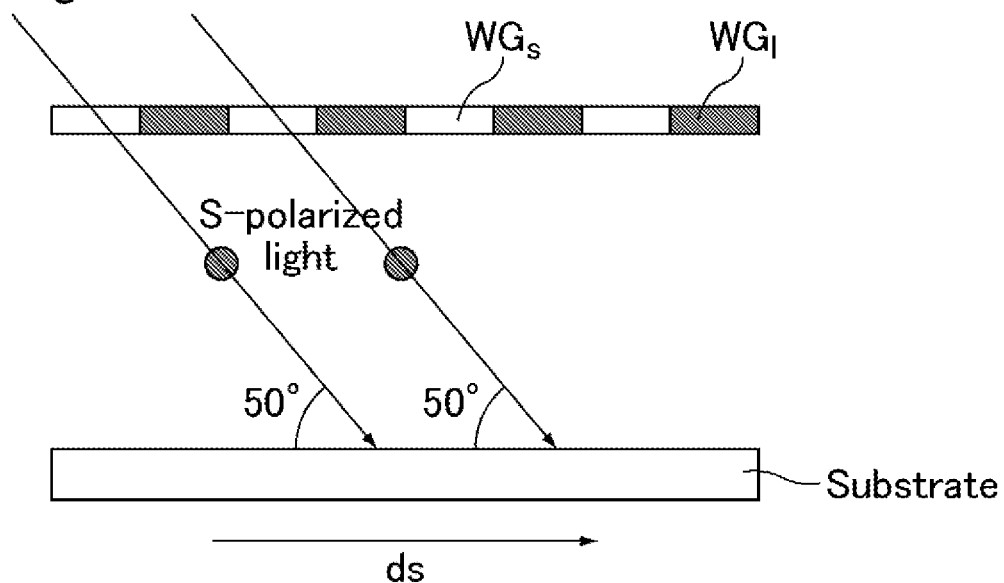
FIG. 23 is a schematic view showing how a substrate is irradiated with light beams having passed through wire grid regions of a wire grid polarizer in Example 8.
Figure 24:
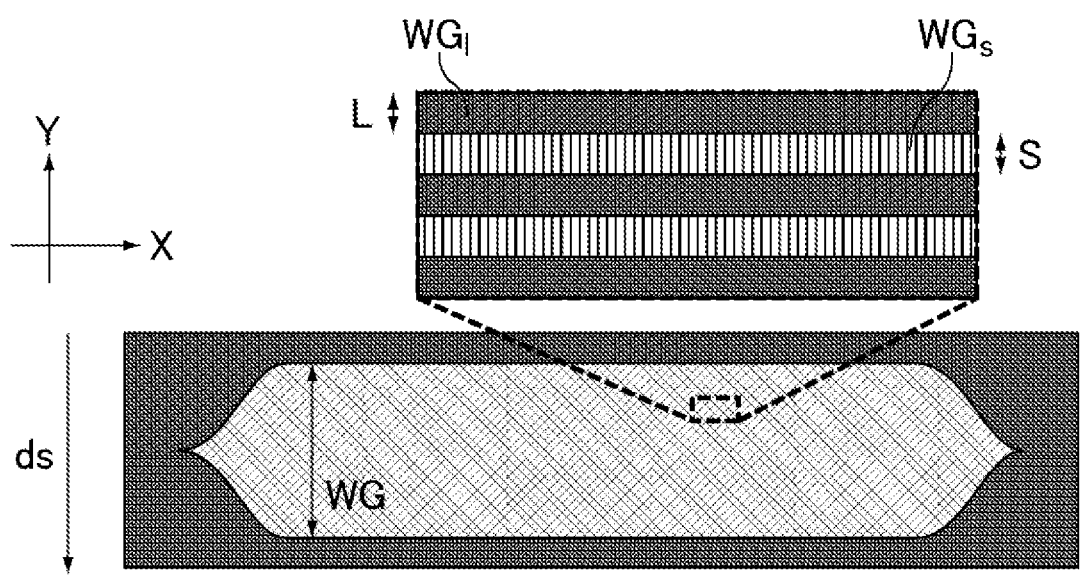
FIG. 24 is a schematic plan view of the wire grid polarizer used in Example 8.

FIG. 23 is a schematic view showing how a substrate is irradiated with light beams having passed through wire grid regions of a wire grid polarizer in Example 8. FIG. 24 is a schematic plan view of the wire grid polarizer used in Example 8.

A polyamic acid solution was applied to a TFT substrate and a CF substrate (the polyamic acid solution used was a solution of 5% by mass polyamic acid in a solvent containing N-methyl-2-pyrrolidone (NMP) and butyl cellosolve (BC) at a ratio of 7:3. The polyamic acid had a cinnamate group in its diamine side chain). Each substrate was pre-baked at 90° C. for one minute. The pre-baked substrate had a thickness of 100 nm. The substrate was then post-baked at 200° C. for 40 minutes. Thereafter, exposure was performed while the substrate (TFT substrate or CF substrate) was moved in the substrate-moving direction ds.

Each of the WG polarizers used in the exposure of the TFT substrate and the CF substrate was one shown in FIG. 24. Scanning exposure was performed with the geometry shown in FIG. 3 and FIG. 4.

As shown in FIG. 23, in Example 8, s-polarized light is applied to the film surface through the WG regions WG$_s$ of the WG polarizer. As with the light-shielding region B, light-shielding portions WG$_l$ of the WG polarizer block light.

The WG polarizer shown in FIG. 24 includes s-polarized light transmissive regions WG$_p$ extending in the X direction and including wire grids between which fine slit openings are provided, the light-shielding portions WG$_l$ extending in the X direction and arranged between the polarized light transmissive regions, and the light-shielding region B extending in the X direction and surrounding the s-polarized light transmissive regions, in a plan view of the polarizer.

The irradiation dose of light beams applied through the WG regions WG$_s$ of the WG polarizer shown in FIG. 24 was 20 mJ/cm$^2$ at a wavelength of 313 nm. The slit pattern in the WG polarizer was L/S=10 μm/10 μm. The scanning rate for the substrate was 70 mm/sec. Exposure was performed such that the pre-tilt azimuths provided by the TFT substrate and the CF substrate were perpendicular to each other. Then, the substrates were post-baked at 110° C. for 20 minutes, subsequently at 200° C. for 20 minutes. The TFT substrate and the CF substrate were bonded to each other, and liquid crystal was sealed between them. The liquid crystal used was obtained by dissolving a chiral agent in MLC3019 (Merck Ltd.). To the outer surfaces of the TFT substrate and the CF substrate were bonded polarizers such that their transmission axes were parallel to each other. Thereby, a TN-mode liquid crystal panel was produced. The pre-tilt angle measured was 4.6°. A TN-mode liquid crystal panel providing uniform display without disclination or light leakage was produced.

In Example 8, the pre-tilt angles were induced by providing the fine slits in the WG polarizer and applying s-polarized light through the WG regions provided with the slits. A large-area TN liquid crystal panel without light leakage was produced using such pre-tilt angles and the WG polarizers coupled with each other via the coupling portions.

Example 9

Figure 25:
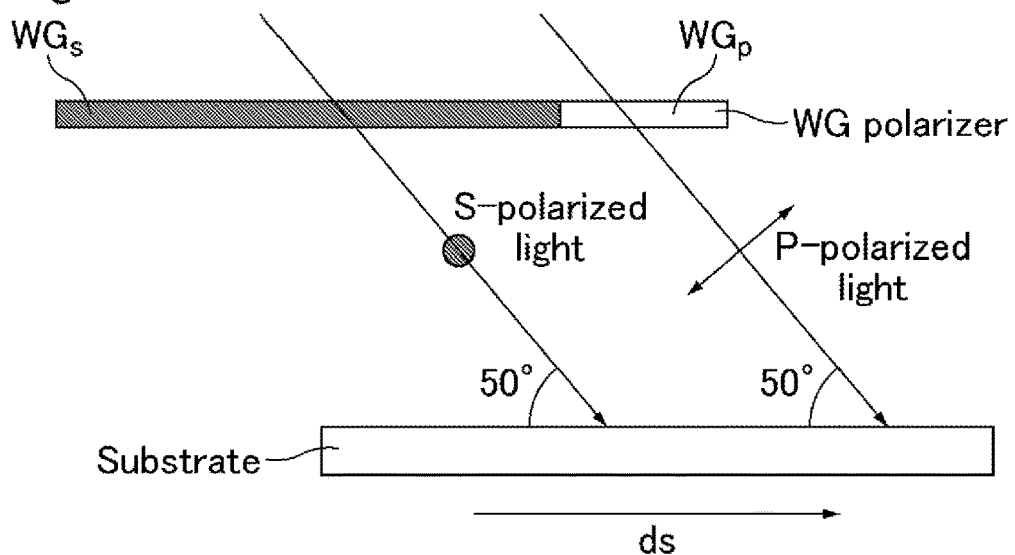
FIG. 25 is a schematic view showing how a substrate is irradiated with light beams having passed through a first wire grid region and a second wire grid region of a wire grid polarizer in Example 9.
Figure 26:
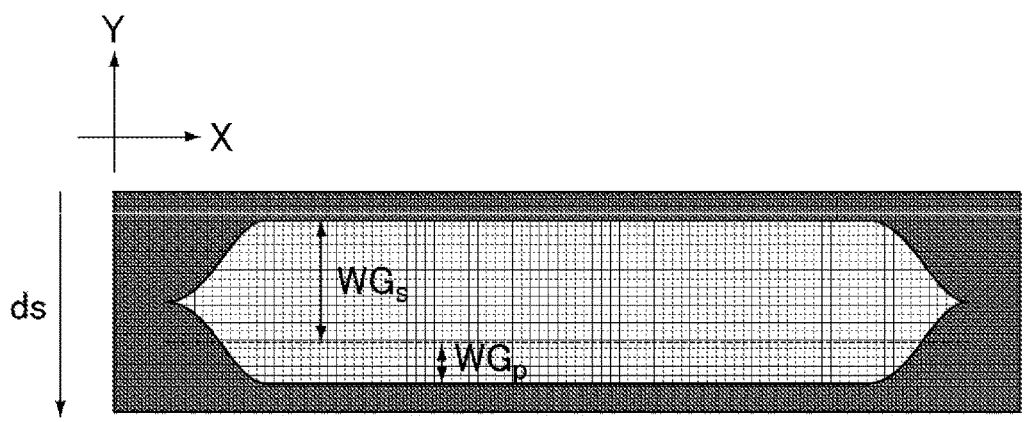
FIG. 26 is a schematic plan view of the wire grid polarizer used in Example 9.

FIG. 25 is a schematic view showing how a substrate is irradiated with light beams having passed through a first wire grid region and a second wire grid region of a wire grid polarizer in Example 9. FIG. 26 is a schematic plan view of the wire grid polarizer used in Example 9.

A polyamic acid solution was applied to a TFT substrate and a CF substrate (the polyamic acid solution used was a solution of 5% by mass polyamic acid in a solvent containing N-methyl-2-pyrrolidone (NMP) and butyl cellosolve (BC) at a ratio of 7:3. The polyamic acid had a cinnamate group in its diamine side chain). Each substrate was pre-baked at 90° C. for one minute. The pre-baked substrate had a thickness of 100 nm. The substrate was then post-baked at 200° C. for 40 minutes. Thereafter, exposure was performed while the substrate (TFT substrate or CF substrate) was moved in the substrate-moving direction ds.

Each of the WG polarizers used in the exposure of the TFT substrate and the CF substrate was one shown in FIG. 24. Scanning exposure was performed with the geometry shown in FIG. 3 and FIG. 4.

As shown in FIG. 25, in Example 9, s-polarized light is applied to the film surface through the s-polarized light transmissive region $WG_s$ of the WG polarizer, while p-polarized light is applied to the film surface through the p-polarized light transmissive region $WG_p$ of the WG polarizer.

The WG polarizer shown in FIG. 26 includes the p-polarized light transmissive region $WG_p$ including wire grids, the s-polarized light transmissive region $WG_s$ including wire grids, and the light-shielding region B, in a plan view of the polarizer.

The irradiation dose of light beams applied through the s-polarized light transmissive region of the WG polarizer shown in FIG. 26 was 20 mJ/cm² at a wavelength of 313 nm while the irradiation dose of light beams applied through the p-polarized light transmissive region was 5 mJ/cm² at a wavelength of 313 nm. The scanning rate for the substrate was 70 mm/sec. Exposure was performed such that the pre-tilt azimuths provided by the TFT substrate and the CF substrate were perpendicular to each other. The TFT substrate and the CF substrate were then bonded to each other, and liquid crystal was sealed between them. The liquid crystal used was obtained by dissolving a chiral agent in MLC3019 (Merck Ltd.). To the outer surfaces of the TFT substrate and the CF substrate were bonded polarizers such that their transmission axes were parallel to each other. Thereby, a TN-mode liquid crystal panel was produced. The pre-tilt angle measured was 0.2°. A TN-mode liquid crystal panel providing uniform display without disclination or light leakage was produced.

In Example 9, two-stage exposure was performed in one scanning exposure process. In other words, with the first WG regions and the second WG regions in the WG polarizer, the first stage exposure was performed by applying s-polarized light as the first polarized light from an oblique direction through the first WG regions, and the second stage exposure was performed by applying p-polarized light as the second polarized light from an oblique direction through the second WG regions.

Figure 27:
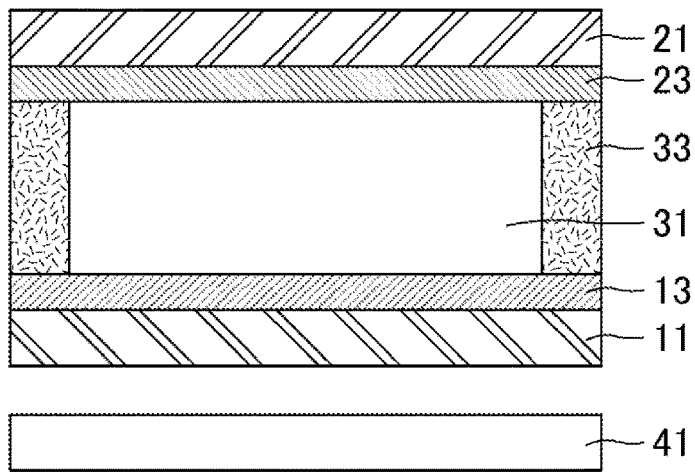
FIG. 27 is a schematic cross-sectional view of a liquid crystal panel obtainable by the method for manufacturing a liquid crystal panel according to Example 9.

FIG. 27 is a schematic cross-sectional view of a liquid crystal panel obtainable by the method for manufacturing a liquid crystal panel according to Example 9.

A liquid crystal panel obtainable by the method for manufacturing a liquid crystal panel according to the present example includes a color filter (CF) substrate 21, a photo-alignment film 23, a liquid crystal layer 31, a photo-alignment film 13, and a TFT substrate 11 from the display surface side. The TFT substrate includes a liquid crystal driver and an insulating layer. The CF substrate 21 includes color filters (CFs). Between the CFs and the liquid crystal layer may be arranged a common electrode. In the case where the liquid crystal panel according to the present example is in the transflective or transmissive mode, a backlight 41 may be arranged behind the TFT substrate 11. The liquid crystal panel may also include other members usable in a liquid crystal panel.

The configurations of the above examples are applicable to, for example, (1) TN-mode liquid crystal panels, (2) alignment-divided TN-mode liquid crystal panels, (3) transflective alignment-divided FFS-mode liquid crystal panels, (4) ECB-mode liquid crystal panels, and (5) liquid crystal panels including alignment regions providing different pre-tilt angles. With these configurations, such liquid crystal panels can be produced with a high throughput and at high quality.

Example 10

An acrylic solution was applied to a TFT substrate and a CF substrate (pixel pitch P: 96 μm) each having a size of 320 mm×400 mm (the acrylic solution used was a solution of 10% by mass acrylic polymer in a solvent containing N-methyl-2-pyrrolidone (NMP) and butyl cellosolve (BC) at a ratio of 7:3. The acrylic polymer had a cinnamate group in its diamine side chain). Each substrate was pre-baked at 90° C. for one minute. The pre-baked substrate had a thickness of 1300 nm. Thereafter, exposure was performed while the substrate (TFT substrate or CF substrate) was moved in the substrate-moving direction ds.

Each of the WG polarizers used was the same as that used in the modified example of Example 1, and the irradiation doses of the polarized light beams were each 5 mJ/cm² at a wavelength of 313 nm. The average gap (proximity gap) between the WG polarizer and the exposure surface of the substrate was 200 μm. The scanning rate for the substrate was 70 mm/sec. The beam divergence angle in exposure was 1°. The substrate was then post-baked at 130° C. for 10 minutes.

Thereby, a 132-nm retardation layer was formed on each of the TFT substrate and the CF substrate.

The vertical alignment films JALS204 from JSR Corporation were formed on the respective TFT substrate and CF substrate, and negative liquid crystal MLC6610 was sealed between them. Thereby, a VA-FFS-mode liquid crystal panel was produced. To this liquid crystal panel was bonded linear polarizers whose absorption axes were at an angle of ±45° relative to the respective slow axes of the retardation layers of the TFT substrate and the CF substrate. Thereby, a VA-mode 3D liquid crystal panel was produced.

(Display Uniformity in Example 10)

In order to determine whether the substrate was more evenly exposed to light through the coupling portions Rx of the WG polarizers, a gray screen at a grayscale value of 32 was visually evaluated in a dark room using a backlight set at a luminance of 5000 cd/m². No display unevenness was visually observed.

(Image Sticking in Example 10)

A checkered pattern image was displayed at grayscale values of 255 and 0 for one hour, followed by visual observation of a gray screen at a grayscale value of 32 in a dark room using a backlight set at a luminance of 5000 cd/m². No image sticking was visually observed.

In Example 10, retardation layers were formed inside the panel, with the slow axes of the retardation layers in adjacent pixels being different from each other. Combining the configurations in Example 1 and Example 10, for example, allows free combination of the retardation layers and the alignment of the liquid crystal layer. This leads to production of liquid crystal panels having new functions.

In Example 10, the polymer constituting the photo-alignment film can function as a retardation layer. A photo-alignment film, already having a retardation, can be formed as a retardation layer inside the liquid crystal panel by controlling the photo-alignment film to have an appropriate thickness and controlling the irradiation dose. Also, the photo-alignment method of the present invention is favorably applicable to production of a retarder. The retarder material can be, as described above, a reactive mesogen (RM), a polymer containing a RM, a known polymer for retarders, or a polymer similar to the photo-alignment film polymer described above. The retardation layer preferably has a retardation of 50 to 300 nm, more preferably 100 to 150 nm. According to the present invention, the retardation direction and the retardation amount can be finely controlled as desired, so that a large-area retardation layer having a fine structure can be produced.

The method for manufacturing a retarder according to the present invention enables production of a finely patterned retardation layer inside the panel, for example, more specifically simple production of a liquid crystal panel capable of providing 3D images. As well as to liquid crystal panels used for display elements, the photo-alignment method of the present invention is applicable to liquid crystal panels used for optical elements such as antennas, retarders, holograms, and optical waveguides which employ liquid crystal or a photo-alignment film.

The configurations of the examples described above may appropriately be combined within the spirit of the present invention.

Additional Remarks

One aspect of the present invention may be a method for manufacturing a liquid crystal panel, the liquid crystal panel including paired substrates facing each other; a liquid crystal layer disposed between the substrates; and an alignment film disposed on a surface of at least one of the substrates adjacent to the liquid crystal layer, the method including: irradiating a film of a photo-alignment film material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

The polarized light irradiation in the present invention is applicable not only to photo-alignment films but also to retarders, for example. In other words, another aspect of the present invention may be a method for manufacturing a liquid crystal panel, the liquid crystal panel including paired substrates facing each other; a liquid crystal layer disposed between the substrates; and a retarder, the method including: irradiating a film of a retarder material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

The present invention features use of a specific polarizer in the polarized light irradiation. The polarizer may be any polarizer that can achieve the effects of the present invention, such as a polarizer obtained by coupling polarizers with each other. Light from the light source is usually non-polarized light. The polarizer is typically arranged in an exposure device at a given distance from the substrate.

After being subjected to the polarized light irradiation, the photo-alignment film can provide a pre-tilt angle to liquid crystal molecules near the film.

The method for manufacturing a liquid crystal panel according to the present invention may further include forming a film of a photo-alignment film material on each substrate; baking the films; bonding the two substrates such that they face each other; injecting liquid crystal between the substrates; and bonding a polarizer to the outer surface of each substrate. All of these steps can be performed by commonly used methods.

The films may be baked before or after the polarized light irradiation or both before and after the polarized light irradiation.

In the method for manufacturing a liquid crystal panel according to the present invention, at least one of the polarizers is preferably a wire grid polarizer, and all of the polarizers are more preferably wire grid polarizers.

The alignment of each alignment film can be divided by producing polarized light beams with multiple polarization directions using one wire grid polarizer.

The expression that "the polarizer is a wire grid polarizer" means that the polarizer includes wire grids in its polarized light transmissive region.

In the method for manufacturing a liquid crystal panel according to the present invention, the outline shape of each end portion of the polarized light transmissive region is preferably a sine curve. Thereby, the display uniformity of the liquid crystal panel obtained by the manufacturing method of the present invention can be made better.

In the method for manufacturing a liquid crystal panel according to the present invention, preferably, the polarized light transmissive region includes first polarized light transmissive regions and second polarized light transmissive regions which are arranged in a repetitive pattern, and the first polarized light transmissive regions and the second polarized light transmissive regions transmit polarized light beams with different polarization directions. The first polarized light transmissive regions and the second polarized light transmissive regions are preferably arranged alternately in stripes in the X direction. Thereby, in the polarized light irradiation, for example, first alignment regions can be formed in pixels by applying first polarized light beams to the film through the first polarized light transmissive regions using a light source, and second alignment regions can be formed by applying second polarized light beams, whose polarization direction is different from the polarization direction of the first polarized light beams, to the film through the second polarized light transmissive regions using a light source. In other words, a two-domain liquid crystal panel obtainable by the manufacturing method of the present invention excellent in display uniformity and anti-image sticking properties can be produced in one scanning exposure process. Such a liquid crystal panel specifically includes alignment films each including first alignment regions and second alignment regions, wherein the first alignment regions and the second alignment regions are alternately arranged in stripes, and the first alignment regions and the second alignment regions differ from each other in alignment of liquid crystal molecules near the alignment films with no voltage applied.

In the liquid crystal panel of the present invention, preferably, the alignment of liquid crystal is preferably divided with no voltage applied. This configuration leads to better viewing angle characteristics.

At least one of the liquid crystal alignment modes for multiple regions providing different alignment directions to the liquid crystal is preferably the IPS mode or the FFS mode.

The alignment division pattern pitch of the first alignment regions and the second alignment regions is twice the pitch of pixels or lower.

In the method for manufacturing a liquid crystal panel according to the present invention, preferably, the liquid crystal panel is a transflective liquid crystal panel, the polarized light transmissive region has a shape with its width in the Y direction varying periodically in a portion other than the end portions, and the polarized light irradiation includes, using the light source, irradiating a portion of the film corresponding to a reflective region of a pixel with polarized light through a portion of the polarized light transmissive region having a small width in the Y direction, and irradiating a portion of the film corresponding to a transmissive region of the pixel with polarized light through a portion of the polarized light transmissive region having a large width in the Y direction. With the above shape of the polarized light transmissive region, the exposure amount (light absorption amount) for the alignment film can be different for different alignment film regions. Thereby, for example, the exposure amount for the alignment film is reduced in the reflective region of each pixel while the exposure amount for the alignment film is increased in the transmissive region of each pixel, so that the obtained liquid crystal panel has better anti-image sticking properties.

The condition where the exposure amounts are different for different regions of the alignment film as described above is also referred to as exposure amount division. The pattern pitch of the exposure amount division is preferably twice the pixel pitch or lower.

In the method for manufacturing a liquid crystal panel according to the present invention, preferably, the polarized light applied in the polarized light irradiation is parallel light. With this configuration, the proximity gap can be wide and thus scratches on the substrate due to dust can be sufficiently reduced in the polarized light irradiation.

In the method for manufacturing a liquid crystal panel according to the present invention, preferably, the photo-alignment film aligns liquid crystal molecules in the direction parallel to a surface of the photo-alignment film.

In the method for manufacturing a liquid crystal panel according to the present invention, preferably, the photo-alignment film contains a polymer with a photo-functional group, and the photo-functional group is at least one selected from the group consisting of cinnamate, azobenzene, and cyclobutane groups. The method for manufacturing a liquid crystal panel according to the present invention enables provision of a pre-tilt angle and alignment division in one exposure process by utilizing such a perpendicular photo-alignment film material that can achieve better anti-image sticking properties and better long-term reliability.

In the method for manufacturing a liquid crystal panel of the present invention, preferably, the irradiation direction of the polarized light in the polarized light irradiation is oblique to the direction normal to the surface of the substrate.

In the method for manufacturing a liquid crystal panel according to the present invention, preferably, each of the polarizers further includes an opening region, the opening region and the polarized light transmissive region are arranged next to each other in the Y direction, and the polarized light irradiation includes, using the light source, irradiating the film with non-polarized light through the opening region and irradiating the film with polarized light through the polarized light transmissive region. More preferably, for example, the polarized light irradiation includes irradiating certain regions of a film with non-polarized light through the opening region, and then irradiating the regions with polarized light (e.g., s-polarized light) through the polarized light transmissive regions.

In the method for manufacturing a liquid crystal panel according to the present invention, preferably, each of the polarizers includes polarized light transmissive regions and light-shielding portions disposed between the polarized light transmissive regions, the polarized light transmissive regions and the light-shielding portions are arranged alternately in the Y direction, and the polarized light irradiation includes, using the light source, irradiating the film with polarized light through the polarized light transmissive regions. More preferably, for example, the polarized light irradiation includes irradiating certain regions of a film with polarized light (e.g., s-polarized light) through multiple polarized light transmissive regions in one scanning exposure process. In the case where each polarizer includes multiple polarized light transmissive regions, the width of the polarized light transmissive regions in the Y direction is the sum of the widths of the polarized light transmissive regions in the Y direction.

In the method for manufacturing a liquid crystal panel according to the present invention, preferably, the polarized light transmissive region includes first polarized light transmissive regions and second polarized light transmissive regions, the first polarized light transmissive regions and the second polarized light transmissive regions being arranged next to each other in the Y direction and transmitting polarized light beams with different polarization directions, and the polarized light irradiation includes, using the light source, irradiating the film with first polarized light through the first polarized light transmissive regions and irradiating the film with second polarized light whose polarization direction is different from the polarization direction of the first polarized light through the second polarized light transmissive regions. More preferably, for example, the polarized light irradiation includes irradiating certain regions of a film with the first polarized light (e.g., s-polarized light) through the first polarized light transmissive region, and then irradiating the regions with second polarized light (e.g., p-polarized light) whose polarization direction is different from the first polarized region through the second polarized light transmissive region.

In the method for manufacturing a liquid crystal panel according to the present invention, preferably, the liquid crystal molecules in the liquid crystal panel are twist-aligned.

The liquid crystal panel of the present invention can be suitable as any of transmissive liquid crystal panels, reflective liquid crystal panels, and transflective liquid crystal panels.

The photo-alignment method according to the present invention enables production of liquid crystal panels capable of providing 3D images as well as devices such as electronic book readers, digital photo frames, industrial appliances (IAs), personal computers (PCs), tablet PCs, and smartphones, and enables suitable production of liquid crystal panels used for optical elements such as antennas, retarders, holograms, and optical waveguides which employ liquid crystal or a photo-alignment film.

Yet another aspect of the present invention may be a method for manufacturing a retarder, including irradiating a film of a retarder material formed on a surface of a substrate with light emitted from a light source and polarized by polarizers, the polarized light irradiation being performed while the substrate and/or the light source is moved, each of the polarizers including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source.

Yet another aspect of the present invention may be a wire grid polarizer, including polarizers each including a polarized light transmissive region and a light-shielding region that surrounds the polarized light transmissive region, the polarized light transmissive region including end portions where the width of the polarized light transmissive region in a Y direction decreases toward the ends in an X direction, the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the wire grid polarizer.

REFERENCE SIGNS LIST

B: Light-shielding region
$dp_\alpha$, $dp_\beta$, $dp_\gamma$: Polarization direction
ds: Substrate-moving direction
F1, F2: FFS-mode region
Fr: FFS-mode reflective region
Ft: FFS-mode transmissive region
GL: Gate bus line
LC: Liquid crystal molecule
M: Metallic reflective film
n: Non-polarized light transmissive region (opening region)
P: Pixel pitch
P1, P2, WG1, WG2, WG3, WG11, WG12, WG21, WG22: Wire grid region (WG region)
Rx: Coupling portion
S: Slit
SL: Source bus line
TFT: Thin-film transistor element
Tr: Reflective twist region
WG: Wire grid
$WG_l$: Light-shielding portion
$WG_p$: P-polarized light transmissive region
$WG_s$: S-polarized light transmissive region
11: TFT substrate
13: photo-alignment film
21: Color filter (CF) substrate
23: Photo-alignment film
31: Liquid crystal layer
41: Backlight

The invention claimed is:

1. A method for manufacturing a liquid crystal panel, the liquid crystal panel including paired substrates facing each other; a liquid crystal layer disposed between the substrates; and a photo-alignment film disposed on a surface of at least one of the substrates adjacent to the liquid crystal layer,
the method comprising:
irradiating a film of a photo-alignment film material formed on a surface of a substrate with light emitted from a light source and polarized by polarizers,
the polarized light irradiation being performed while the substrate and/or the light source is moved,
each of the polarizers including a polarized light transmissive region and a light-shielding region that surrounds the polarized light transmissive region,
the polarized light transmissive region including end portions where the width of the polarized light transmissive region in a Y direction decreases toward the ends in an X direction,
the polarizers being coupled with each other such that at least one end portion of each polarized light transmissive region is superimposed on an end portion of an adjacent polarized light transmissive region as viewed in the Y direction, wherein the X direction and the Y direction are perpendicular to each other in a plane parallel to the main surfaces of the polarizers, and the Y direction is a moving direction of the substrate relative to the light source, the liquid crystal panel is a transflective liquid crystal panel, the polarized light transmissive region has a shape with its width in the Y direction varying periodically in a portion other than the end portions, and the polarized light irradiation includes, using the light source, irradiating a portion of the film corresponding to a reflective region of a pixel with polarized light through a portion of the polarized light transmissive region having a small width in the Y direction, and irradiating a portion of the film corresponding to a transmissive region of the pixel with polarized light through a portion of the polarized light transmissive region having a large width in the Y direction.

2. The method for manufacturing a liquid crystal panel according to claim 1,
wherein at least one of the polarizers is a wire grid polarizer.

3. The method for manufacturing a liquid crystal panel according to claim 1,
wherein the outline shape of each end portion of the polarized light transmissive region is a sine curve.

4. The method for manufacturing a liquid crystal panel according to claim 1,
wherein the polarized light transmissive region includes first polarized light transmissive regions and second polarized light transmissive regions which are arranged in a repetitive pattern, and
the first polarized light transmissive regions and the second polarized light transmissive regions transmit polarized light beams with different polarization directions.

5. The method for manufacturing a liquid crystal panel according to claim 1,
wherein the polarized light applied in the polarized light irradiation is parallel light.

6. The method for manufacturing a liquid crystal panel according to claim 1,
wherein the photo-alignment film aligns liquid crystal molecules in the direction parallel to a surface of the photo-alignment film.

7. The method for manufacturing a liquid crystal panel according to claim 1,
wherein the photo-alignment film contains a polymer with a photo-functional group, and
the photo-functional group is at least one selected from the group consisting of cinnamate, azobenzene, and cyclobutane groups.

8. The method for manufacturing a liquid crystal panel according to claim 1,
wherein the irradiation direction of the polarized light in the polarized light irradiation is oblique to the direction normal to the surface of the substrate.

9. The method for manufacturing a liquid crystal panel according to claim 1,
wherein each of the polarizers further includes an opening region,
the opening region and the polarized light transmissive region are arranged next to each other in the Y direction, and
the polarized light irradiation includes, using the light source, irradiating the film with non-polarized light through the opening region and irradiating the film with polarized light through the polarized light transmissive region.

10. The method for manufacturing a liquid crystal panel according to claim 1,
wherein each of the polarizers includes polarized light transmissive regions and light-shielding portions disposed between the polarized light transmissive regions,
the polarized light transmissive regions and the light-shielding portions are arranged alternately in the Y direction, and
the polarized light irradiation includes, using the light source, irradiating the film with polarized light through the polarized light transmissive regions.

11. The method for manufacturing a liquid crystal panel according to claim 1,
wherein the polarized light transmissive region includes first polarized light transmissive regions and second polarized light transmissive regions, the first polarized light transmissive regions and the second polarized light transmissive regions being arranged next to each other in the Y direction and transmitting polarized light beams with different polarization directions, and
the polarized light irradiation includes, using the light source, irradiating the film with first polarized light through the first polarized light transmissive regions and irradiating the film with second polarized light whose polarization direction is different from the polarization direction of the first polarized light through the second polarized light transmissive regions.

12. A method for manufacturing a liquid crystal panel,
the liquid crystal panel including paired substrates facing each other; a liquid crystal layer disposed between the substrates; and a photo-alignment film disposed on a surface of at least one of the substrates adjacent to the liquid crystal layer,
the method comprising:
irradiating a film of a photo-alignment film material formed on a surface of a substrate with light emitted from a light source and polarized by polarizers,
the polarized light irradiation being performed while the substrate and/or the light source is moved,
each of the polarizers including a polarized light transmissive region and a light-shielding region that surrounds the polarized light transmissive region,
the polarized light transmissive region including end portions where the width of the polarized light transmissive region in a Y direction decreases toward the ends in an X direction,
the polarizers being coupled with each other such that at least one end portion of each polarized light transmissive region is superimposed on an end portion of an adjacent polarized light transmissive region as viewed in the Y direction,
wherein the X direction and the Y direction are perpendicular to each other in a plane parallel to the main surfaces of the polarizers, and the Y direction is a moving direction of the substrate relative to the light source,
each of the polarizers further includes an opening region,
the opening region and the polarized light transmissive region are arranged next to each other in the Y direction, and
the polarized light irradiation includes, using the light source, irradiating the film with non-polarized light through the opening region and irradiating the film with polarized light through the polarized light transmissive region.

13. The method for manufacturing a liquid crystal panel according to claim 12,
wherein at least one of the polarizers is a wire grid polarizer.

14. The method for manufacturing a liquid crystal panel according to claim 12,
wherein the outline shape of each end portion of the polarized light transmissive region is a sine curve.

15. The method for manufacturing a liquid crystal panel according to claim 12,
wherein the polarized light transmissive region includes first polarized light transmissive regions and second polarized light transmissive regions which are arranged in a repetitive pattern, and
the first polarized light transmissive regions and the second polarized light transmissive regions transmit polarized light beams with different polarization directions.

16. The method for manufacturing a liquid crystal panel according to claim 12,
wherein the polarized light applied in the polarized light irradiation is parallel light.

17. The method for manufacturing a liquid crystal panel according to claim 12,
wherein the photo-alignment film aligns liquid crystal molecules in the direction parallel to a surface of the photo-alignment film.

18. The method for manufacturing a liquid crystal panel according to claim 12,
wherein the photo-alignment film contains a polymer with a photo-functional group, and
the photo-functional group is at least one selected from the group consisting of cinnamate, azobenzene, and cyclobutane groups.

19. The method for manufacturing a liquid crystal panel according to claim 12,
wherein the irradiation direction of the polarized light in the polarized light irradiation is oblique to the direction normal to the surface of the substrate.

20. The method for manufacturing a liquid crystal panel according to claim 12,
wherein each of the polarizers includes polarized light transmissive regions and light-shielding portions disposed between the polarized light transmissive regions,
the polarized light transmissive regions and the light-shielding portions are arranged alternately in the Y direction, and
the polarized light irradiation includes, using the light source, irradiating the film with polarized light through the polarized light transmissive regions.

21. The method for manufacturing a liquid crystal panel according to claim 12,
wherein the polarized light transmissive region includes first polarized light transmissive regions and second polarized light transmissive regions, the first polarized light transmissive regions and the second polarized light transmissive regions being arranged next to each other in the Y direction and transmitting polarized light beams with different polarization directions, and
the polarized light irradiation includes, using the light source, irradiating the film with first polarized light through the first polarized light transmissive regions and irradiating the film with second polarized light whose polarization direction is different from the polarization direction of the first polarized light through the second polarized light transmissive regions.

* * * * *